US006784405B2

(12) United States Patent
Flugstad et al.

(10) Patent No.: US 6,784,405 B2
(45) Date of Patent: Aug. 31, 2004

(54) VARIABLE FREQUENCY AUTOMATED CAPACITIVE RADIO FREQUENCY (RF) DIELECTRIC HEATING SYSTEM

(75) Inventors: Benjamin A. Flugstad, P.O. Box 3447, Silverdale, WA (US) 98383; Qingyue Ling, Beaverton, OR (US); Edward R. Kolbe, Portland, OR (US); John Henry Wells, Portland, OR (US); Yanyun Zhao, Corvallis, OR (US); Jae W. Park, Warrenton, OR (US)

(73) Assignees: The State of Oregon, acting by and through the State Board of Higher Education on Behalf of Oregon State University, Corvallis, OR (US); Benjamin A. Flugstad, Port Hadlock, WA (US)

( * ) Notice: Subject to any disclaimer, the term of this patent is extended or adjusted under 35 U.S.C. 154(b) by 111 days.

(21) Appl. No.: 10/423,411

(22) Filed: Apr. 24, 2003

(65) Prior Publication Data

US 2003/0205571 A1 Nov. 6, 2003

Related U.S. Application Data

(60) Division of application No. 09/938,468, filed on Aug. 23, 2001, which is a continuation-in-part of application No. 09/295,666, filed on Apr. 21, 1999, now Pat. No. 6,303,166.
(60) Provisional application No. 60/082,586, filed on Apr. 21, 1998.

(51) Int. Cl.[7] .................................................. H05B 1/02

(52) U.S. Cl. ........................ 219/497; 219/505; 219/771

(58) Field of Search ................................. 219/497, 505, 219/501, 771, 779, 778, 780; 426/238, 239, 240, 241, 242, 243; 516/68; 427/131; 313/574; 324/664

(56) References Cited

U.S. PATENT DOCUMENTS

| | | | |
|---|---|---|---|
| 2,434,966 A | * | 1/1948 | Name not available .... 159/11.1 |
| 3,323,049 A | * | 5/1967 | Name not available ..... 324/666 |
| 3,945,170 A | | 3/1976 | Brown |
| 4,230,731 A | | 10/1980 | Tyler |
| 4,549,056 A | | 10/1985 | Okatsuka et al. |
| 4,775,769 A | | 10/1988 | Jones |
| 4,812,609 A | | 3/1989 | Butot |
| 5,218,309 A | * | 6/1993 | Nelson et al. ............... 324/664 |
| 5,266,766 A | | 11/1993 | Hecox |
| 5,777,475 A | | 7/1998 | Vester |
| 6,124,584 A | | 9/2000 | Blaker et al. |
| 6,147,503 A | | 11/2000 | Nelson et al. |
| 6,259,334 B1 | | 7/2001 | Howald |

FOREIGN PATENT DOCUMENTS

| | | | | |
|---|---|---|---|---|
| CA | 2235464 | 10/1999 | | |
| EP | 0 412 568 | 2/1991 | | |
| JP | 03100449 A | * | 4/1991 | .......... G01N/27/02 |

OTHER PUBLICATIONS

A.L. Koral, *Proctor—Strayfield Magnatube Radio Frequency Tub Heating System*, (undated).

"Drying the Fry," reprinted from *Potato Business World*, (Oct. 1993).

J.H. Houben et al., "Radio–Frequency Pasteurization of Sausage Emulsions as a Continuous Process," *Journal of Microwave Power and Electromagnetic Energy*, vol. 26, No. 4, pp. 202–205 (1991).

(List continued on next page.)

Primary Examiner—Quang T. Van
(74) Attorney, Agent, or Firm—Klarquist Sparkman, LLP

(57) ABSTRACT

A food product is heated by maintaining the food product in an AC electrical field generated by an RF signal. As the heating takes place, maximum energy is delivered to the food product using automatic impedance matching to adjust the rate of the process.

28 Claims, 19 Drawing Sheets

OTHER PUBLICATIONS

J.H. Houben et al., "Continuous Radio Frequency Pasteurization of Sausage Emulsions," *Proc. Trends in Modern Meat Technology, II*, Pudoc Wageningen, The Netherlands, pp. 73–78 (1988).

N.E. Bengtsson et al., "Radio–Frequency Pasteurization of Cured Hams," *Journal of Food Science*, vol. 35, pp. 681–687 (1970).

Radio Frequency Co., *Applications & Benefits of Heating with Macrowave* (1980).

PSC, Inc., *Radio Frequency Veneer Redry with PSC's Dielectric Dryer/Distributor* (undated).

R. Serota, "Heating with Radio Waves," Reprinted from *Automation*, Sep. 1973, pp. 2–6.

*SADHA News*, http://www.index.co.za/sadha/, pp. 1–5 (1997).

"Update on RF Heating," *Food Manufacturing*, pp. 33–34 (undated).

R.M. Kester, "The Role of Active Containers in Improving Heating Performance in Microwave Ovens," *Microwave World*, abstract, (1986).

* cited by examiner

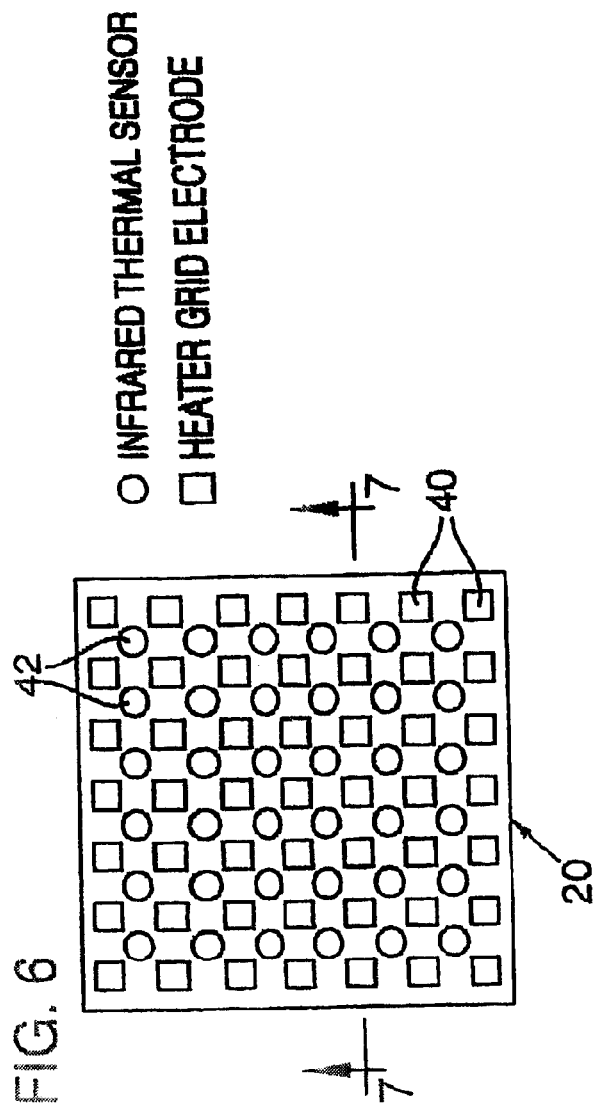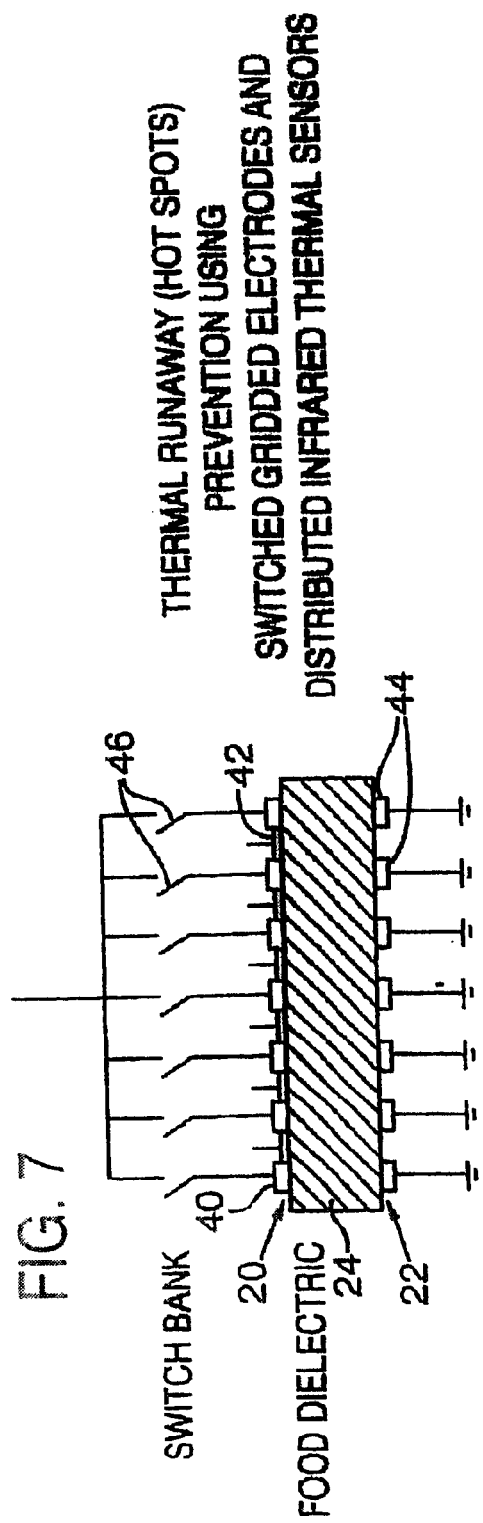

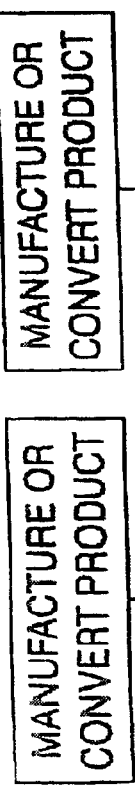
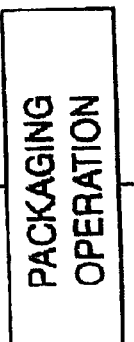
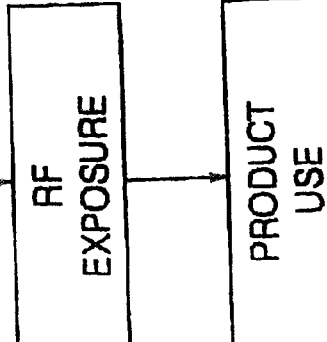
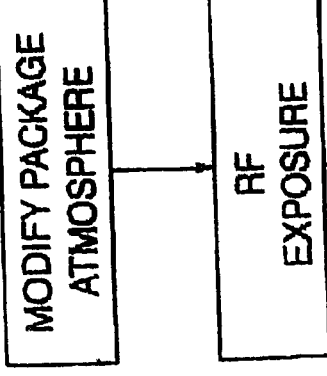
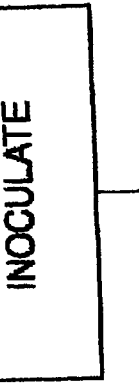
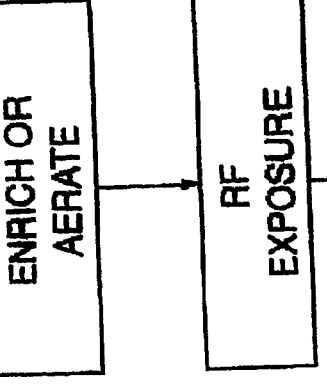

FIG. 12
SEEDS GERMINATION RATES AS RELATED TO RF HEATING—FIRST TESTS

| Frequency (MHz) | Electric Field Intensity (kv/cm) | Final Temp. (°C) | Heating Rate (°C/min) | Germination Rate (%) |
|---|---|---|---|---|
| Radish Seeds | | | | |
| Control | 0 | 22 | 0 | 98 |
| 15±10% | 0.55±20% | 71.14 | 4.66 | 58 |
| 15±10% | 0.85±20% | 68.55 | 8.93 | 41.5 |
| Control | | 22 | 0 | 98 |
| 60±10% | 0.55±20% | 77.17 | 8.58 | 59 |
| 60±10% | 0.85±20% | 80.05 | 16.98 | 70 |
| Alfalfa Seeds | | | | |
| Control | 0 | 22 | 0 | 94 |
| 15±10% | 0.55±20% | 74 | 4.18 | 57.5 |
| 15±10% | 0.85±20% | 76 | 11.66 | 59 |
| Control | 0 | 22 | 0 | 92 |
| 60±10% | 0.55±20% | 83 | 12.27 | 74 |
| 60±10% | 0.85±20% | 83 | 20 | 55 |

FIG. 13
SEEDS GERMINATION RATES AS RELATED
TO HEATING RATE AND FINAL SEED TEMPERATURE
SECOND TESTS (AT 31.2-31.6 MHz)

| Sample Code | Final Temp (°C) | Heating Rate (°C/min) | MC (%) | Germination Rate (%) |
|---|---|---|---|---|
| Radish Seeds ||||||
| Control | | | 6.27 | 93 |
| RD-G4-06 | 68.23 | 89 | 5.06 | 71 |
| RD-G4-09 | 71.26 | 58 | 5.11 | 69 |
| RD-G4-03 | 74.25 | 62 | 4.51 | 65 |
| RD-G4-05 | 71.90 | 64 | 4.68 | 64 |
| RD-G4-04 | 76.55 | 59 | 4.77 | 59 |
| RD-G4-08 | 73.14 | 63 | 5.31 | 54 |
| RD-G4-01 | 76.99 | 75 | 5.41 | 32 |
| Alfalfa Seeds ||||||
| Control | | | 7.12 | 92 |
| AF-G4-05 | 68.94 | 80 | 6.60 | 53 |
| AF-G4-01 | 68.28 | 56 | 6.63 | 45 |
| AF-G4-02 | 70.94 | 71 | 5.48 | 44 |
| AF-G4-03 | 75.36 | 64 | 6.34 | 27 |
| AF-G4-04 | 83.38 | 109 | 6.74 | 13 |

FIG. 14
RESULTS FROM MICROBIAL TESTS

| Frequency (MHz) | Electric Field Intensity (kv/cm) | Aerobic Plate Count (CFU/g) | Coliform (MPN/g) | E. Coli (MPN/g) |
|---|---|---|---|---|
| Radish Seeds | | | | |
| 15±10% | 0 | 50 | 23 | <3.6 |
| 15±10% | 0.55±20% | 105 | 38 | <3.6 |
| 15±10% | 0.85±20% | 10 | 18.4 | <3.6 |
| 60±10% | 0 | 25 | 58 | <3.6 |
| 60±10% | 0.55±20% | 47.5 | 56.5 | <3.6 |
| 60±10% | 0.85±20% | 20 | 93 | <3.6 |
| Alfalfa Seeds | | | | |
| 15±10% | 0 | $8.1 \times 10^5$ | >1100 | <3.6 |
| 15±10% | 0.55±20% | $4 \times 10^4$ | >1100 | <3.6 |
| 15±10% | 0.85±20% | $1.3 \times 10^4$ | >1100 | <3.6 |
| 60±10% | 0 | $7.5 \times 10^5$ | >1100 | <3.6 |
| 60±10% | 0.55±20% | $5.2 \times 10^4$ | >1100 | <3.6 |
| 60±10% | 0.85±20% | $2.4 \times 10^4$ | >1100 | <3.6 |

Tray for First Tests

Tray for Second Tests

TIME-TEMPERATURE PROFILES OF
RADISH SEEDS AS RELATED TO RF
FREQUENCY AND ELECTRICAL FIELD
INTENSITY

HEATING UNIFORMITY OF RADISH
SEEDS DURING THE FIRST TESTS

HEATING RATE OF ALFALFA SEEDS
DURING THE SECOND TESTS

TEMPERATURE DISTRIBUTION IN
ALFALFA SEEDS TRAY DURING THE
SECOND TESTS

VARIABLE FREQUENCY AUTOMATED CAPACITIVE RADIO FREQUENCY (RF) DIELECTRIC HEATING SYSTEM

CROSS REFERENCE TO RELATED APPLICATIONS

This application is a division of U.S. patent application Ser. No. 09/938,468, filed Aug. 23, 2001, which is a continuation-in-part of U.S. patent application Ser. No. 09/295,666, filed Apr. 21, 1999 (now U.S. Pat. No. 6,303,166), which claims the benefit of U.S. Provisional Application No. 60/082,586, filed Apr. 21, 1998. All prior applications are incorporated herein by this reference.

This invention was made with government support under NOAA (National Oceanic and Atmospheric Administration) Grant No. NA36RG0451. The government has certain rights in the invention.

BACKGROUND AND SUMMARY

This invention pertains to methods and apparatuses for the capacitive radio frequency (RF) dielectric heating of food and biological products.

A variety of different methods are available for the thermal processing of various materials. Heat is supplied by hot water, steam, resistive heating elements, burners, torches, ovens, electrical conduction (ohmic heating), induction heating (magnetic), capacitive heating (dielectric), and electromagnetic radiative heating (resonant ovens, cavities or chambers) and many other heating methods. Applications include sterilization, pasteurization, thawing, melting, curing, drying, bonding (e.g., laminates), welding, brazing, heating for chemical reactions, and many others. Heated materials include ceramics, rubber, plastics (and other polymers), composites, metals, soils, wood and many types of biological materials including food.

An important application of heating technologies is in the area of the pasteurization and sterilization of foods, particularly foods in large-dimensioned packages. Food safety and quality is becoming an increasingly important topic with the many incidents where people have become sick or died due to unkilled microbial populations in food. For example, alfalfa and radish seeds are raw agricultural commodities that can become contaminated with organic material that harbor pathogens such as Salmonella or E. coli O157:H7 during growing and harvest. Seed processing and storage procedures are aimed at reducing varietal contamination of seeds through the elimination of weed seeds and foreign matter. Such seed cleaning and certification programs insure varietal purity, but provide no means of food safety intervention for seeds destined for sprouting and consumption as food. As a result, there are increasing reports of microbial outbreaks in sprouted seed products such as radish and alfalfa sprouts. Human salmonellosis (due to Salmonella bacteria) and outbreaks of E. coli O157:H7 have been associated with the consumption of alfalfa and radish sprouts in several countries. Alfalfa and radish sprouts, a definitive highly nutritious and perceived healthy food, have been implicated in multi-site outbreaks of food-borne illnesses. Seeds were linked to about 150 confirmed cases of salmonellosis in Oregon and British Columbia in 1996. Also in 1996, radish sprouts were associated with Japan's largest recorded outbreak of E. coli O157:H7 infection with an estimated 11,000 cases that led to eleven deaths. In June and July 1997, simultaneous outbreaks of E. coli O157:H7 infections in Michigan and Virginia were independently associated with eating alfalfa sprouts grown from the same seed lot. A total of 60 people with E. coli O157:H7 infection were reported to the Michigan Department of Community Health and 48 cases reported to the Virginia Department of Health. Recently, the California Department of Health Services identified six cases of E. coli O157:NM with illness onsets from June 16 through Jun. 27, 1998, caused by eating an alfalfa-clover sprout mixture.

The lack of standardization in some heating time/temperature relationships that are required to ensure food product safety is also attracting more focus. In addition, food quality or taste/texture issues are important in our selective consumer oriented society. Therefore there is a need for a heating technology that will achieve the desired microbial kill rates uniformly over that whole food product in a reasonable amount of time with a minimum altering of the overall quality of the food.

In the seafood industry, for example, existing heating technologies for the pasteurization of seafoods employ either hot water or steam. These technologies have several limitations including reliance on thermal conduction from the product surface (resulting in non-uniform heating), slow heating rates (especially in the product center), large floor space requirements, poor overall energy efficiency, generation of large amounts of waste water and limitations on the product geometry (i.e., need to be thin or flat).

Capacitive radio frequency (RF) dielectric heating is used in several industries. They include the drying of various wood and sawdust products in the timber industry, preheating and final drying of paper, drying of textiles, drying of glass fibers and spools, drying water-based glues in the paper-cardboard industry, drying pharmaceutical products, welding plastics, sealing, preheating plastics prior to forming, firing foundry cores in casting, polymerization of fiber panels, gluing of woods such as laminated plywood, printing and marking in the textile, leatherware and shoe industries, melting honey, heating rubber prior to vulcanization, welding glass formed sections, bonding multi-layer glass products, drying of powders, drying leathers and hides, curing of epoxy, curing of plastisol, curing of brake linings, impregnating resins, thermosetting adhesives, curing hardboard and particle board, and many other applications.

The use of capacitive (RF) dielectric heating methods for the pasteurization and sterilization of foods offer several advantages over non-electromagnetic heating methods. These include rapid heating, near independence of the thermal conductivity of the medium (i.e., heat internal portions of medium directly), high energy efficiency, good heating even in the absence of DC electrical conductivity, high energy densities, reduced production floor space, and easy adaptation to automated production batch and/or continuous flow processing. Because capacitive (RF) dielectric heating is rapid, the food product being heated loses less moisture than in conventional heating processes, which is advantageous.

Another application of this technology is in the thawing of frozen foods. Common thawing applications again rely on the thermal conduction of heat from the surface to the interior to provide thawing. Due to freshness and product quality constraints thawing often is done by immersion in water baths that are only slightly above freezing themselves or in refrigerators set to slightly above freezing (e.g., 35–40° F.). Thawing times are often very long. With capacitive heating technologies that heat over the entire volume uniformly, thawing can be performed much more rapidly.

Capacitive (RF) dielectric heating differs from higher frequency electromagnetic radiative dielectric heating (e.g., microwave ovens) in that with capacitive heating the wavelength of the chosen frequency is large compared to the dimensions of the sample being heated whereas with electromagnetic radiative heating the wavelength is comparable or even small compared to the dimensions of the sample being heated. An example of capacitive heating is two large parallel electrodes placed on opposite sides of a wood sample with an AC displacement current flowing through it to heat and dry the wood. An example of electromagnetic radiative heating is a metal chamber with resonant electromagnetic standing wave modes such as a microwave oven. Capacitive heating also differs from lower frequency ohmic heating in that capacitive heating depends on dielectric losses and ohmic heating relies on direct ohmic conduction losses in a medium and requires the electrodes to contact the medium directly (i.e., cannot penetrate a plastic package or air gap). (In some applications, capacitive and ohmic heating are used together.)

Capacitive (RF) dielectric heating methods offer advantages over other electromagnetic heating methods. For example, capacitive (RF) dielectric heating methods offer more uniform heating over the sample geometry than higher frequency radiative dielectric heating methods (e.g., microwave ovens) due to superior or deeper wave penetration into the sample as well as simple uniform field patterns (as opposed to the complex non-uniform standing wave patterns in a microwave oven). In addition capacitive (RF) dielectric heating methods operate at frequencies low enough to use standard power grid tubes that are both lower cost (for a given power level) as well as allow for generally much higher power generation levels than microwave tubes.

Capacitive (RF) dielectric heating methods also offer advantages over low frequency ohmic heating. These include the ability to heat a medium that is enclosed inside an insulating plastic package and perhaps surrounded by an air or de-ionized water barrier (i.e., the electrodes do not have to contact the media directly). The performance of capacitive heating is therefore also less dependent on the product making a smooth contact with the electrodes. Capacitive (RF) dielectric heating methods are not dependent on the presence of DC electrical conductivity and can heat insulators as long as they contain polar dielectric molecules that can partially rotate and create dielectric losses. A typical existing design for a capacitive dielectric heating system is described in Orfeuil, M. 1987. *Electric Process Heating: Technologies/Equipment/Applications*. Columbus: Battelle Press.

Capacitive (RF) heating devices have been used in the food industry, but the reported energy efficiency has been low and heating has not always been uniform. Proctor Strayfield has developed a magnatube pasteurization system (Koral, A. L., 1990. *Proctor-Strayfield Magnatube Radio Frequency Tube Heating System*. Proctor Strayfield, A Division of Proctor & Schwartz, Inc.) that has been demonstrated to be successful in the cooking/sterilization of scrambled eggs as well as in the creation of a "skinless" meatloaf from a pumped slurry using a vertical tube system. Houben et. al of the Netherlands (Houben, J., Schoenmakers, L., van Putten, E., van Roon, P. and Krol, B. 1991. Radio-frequency pasteurization of sausage emulsions as a continuous process. J. Microwave Power & Electromagnetic Energy. 26(4): 202–205.) in 1991 showed that sausage emulsions could be successfully pasteurized using RF heating. Bengtsson et al of Sweden (Bengtsson, N. E., and W. Green. 1970. Radio-Frequency Pasteurization of Cured Hams. *Journal of Food Science*. V35: 681–687) in 1970 demonstrated that cured hams could be pasteurized successfully by RF heating. RF heating feasibility experiments were conducted on packaged and unpackaged surimi seafood samples at a test facility of PSC, Inc. of Cleveland, Ohio (Kolbe, E. 1996. Heating of packaged surimi seafoods in a commercial RF oven. Unpublished information. OSU Dept. of Bioresource Engineering.). The test system was a high power single-frequency capacitive heater set at 18 MHz. Tests on samples placed between parallel electrodes showed that when properly oriented, surimi seafoods could be heated to pasteurization temperatures (85° C.) in less than 10 minutes. The results also showed, however, that packaging can be a complicating factor. For example, small amounts of food trapped in the packaging seams can cause rapid local heating and burning.

Some prior work in the area of dielectric heating has been conducted on seed germination enhancement effects. The possibility of utilizing dielectric energy for stimulating or improving the germination and growth of seeds and for controlling insects has been variously considered for the last forty years (Nelson, S. O. and Walker, E. R. 1961, "Effects of radio-frequency electrical seed treatment," *Agricul. Eng.* 42(12): 688–691; Nelson, S. O. 1976, "Use of microwave and lower power frequency RF energy for improving alfalfa seed germination," *J. Microwave Power* 12(1):67–72; Nelson, S. O. 1996, "Review and assessment of radio-frequency and microwave energy for stored-grain insect control," *Transactions of the ASAE*. 39(4):1475–1484.). Reported effects ranged from accelerated germination and early growth and the killing of fusarium spores to early flowering and high yields of plants grown from treated seeds. Nelson and Walker (1961) reported that brief exposure of alfalfa containing considerable hard seed shells to electrical fields has been highly successful in reducing the hard-seed percentages and producing a corresponding increase in normal seedling germination. Also, benefits from electric treatment have been shown in alfalfa seeds for up to 21 years in storage with no evidence of any short or long term detrimental effects (Nelson, 1961, 1976). Nelson (1976) found that the moisture content of seeds at the time of treatment influenced the degree of response. Generally seeds of lower moisture content responded more favorably to treatment than high moisture content seeds. The final temperature of seeds treated at any given moisture content seemed to be a good indicator of the degree of favorable response. Some work has been done using higher frequency microwave heating for the treatment of seeds. Cavalcante et al. (Cavalcante, M. J. B. and Muchovej, J. J. 1993, "Microwave irradiation of seeds and selected fungal spores," *Seed Sci. & Technol.* 21:247–253) investigated the use of microwave irradiation on seeds and its effects on the control of selected fungal spores.

Some work has been done to characterize the dielectric properties of food and packaging materials. There is preliminary data at lower frequencies for polymers to show temperature-dependent Debye resonance effects (Malik, T. M., R. E. Prud'Homme. 1984. Dielectric Properties of Poly($\alpha$-Methyl-$\alpha$-N-Propyl-$\beta$-Propiolactone)/Poly(Vinyl Chloride) Blends. *Polymer Engineering and Science*. v24, n2 p144–152; Scarpa, P. C. N., Svatik, A. and Das-Gupta, D. K. 1996. Dielectric spectroscopy of polyethylene in the frequency range of $10^{-5}$ Hz to $10^6$ Hz. Polymer Eng. & Sci. 36(8): 1072–1080). And, for food in the medium frequency ranges, limited tabulated data exists (Von Hippel, A. R., 1954. *Dielectric Materials and Applications*. MIT Press; Kent, M. 1987. Electrical and Dielectric properties of food materials. Science and Technology Publishers, England; Mudgett, R. E. 1985. Electrical Properties of Foods. In Microwaves in the Food Processing Industry, R. V. Decareau (Ed.). New York: Academic Press; Pethig, R. 1979. Dielectric and Electronic Properties of Biological Materials. Chichester: John Wiley & Sons, Inc.; Tinga, W. R. and S. O. Nelson. 1973. Dielectric Properties of Materials for Microwave Processing-Tabulated. J. of Microwave Power. 8:1–65; Tran, V. N. and Stuchly, S. S. 1987. Dielectric properties of beef, beef liver, chicken and salmon at frequencies from 100 to 2500 MHz. J. Microwave Power. 29–33). Most data for food has been collected at higher frequencies (>100 MHz) and tied closely to the dielectric behavior of the water in the medium, for applications toward microwave ovens.

A specific disadvantage of capacitive (RF) dielectric heating methods is the potential for thermal runaway or hot spots in a heterogeneous medium since the dielectric losses are often strong functions of temperature (e.g., small pockets of a lossy dielectric food material, for example a small thermal mass trapped in the seams of a package, may heat rapidly and could burn itself and melt the package). Another disadvantage of capacitive heating is the potential for dielectric breakdown (arcing) if the electric field strengths are too high across the sample (making sample thicker and reducing air gaps allows operation at a lower voltage).

The use of edible films to extend shelf life of food products and protect them from harmful environmental effects has been emphasized in the recent years. Interests and research activities in edible films have been especially intense over the past ten years. Edible films are very promising systems for the future improvement of food quality and preservation during processes and storage. Indeed, edible films can be used where plastic packaging cannot be applied. For example, they can separate several compartments within a food. Although edible films are not meant to totally replace synthetic films, they do have the potential to reduce packaging and to limit moisture, aroma, and lipid migration between food components where traditional packaging cannot function.

An edible film is defined as a thin layer of one or more edible materials formed on a food as a coating or placed (pre-formed) on or between food components. Most edible films are natural polymers obtained from agricultural products such as animal and vegetable proteins, gums, and lipid and are perfectly biodegradable and usually water soluble. The general materials that are used to manufacture edible films are cellulose ethers, starch, corn zein, wheat gluten, soy proteins and milk protein. Examples include methyl cellulose (MC), hydroxypropyl cellulose (HPC), sodium and calcium caseinates (SC or CC), and whey protein concentrates (WPC).

The performance of edible packaging is comparable to that of traditional synthetic polymer films with respect to mechanical strength, barrier properties, and compatibility. Applications of edible packaging include its use in inhibiting migration of moisture, oxygen, carbon dioxide, aromas, and lipids, etc. within composite foods; carrying food ingredients (e.g., antioxidants, antimicrobials, flavor); and/or improving mechanical integrity or handling characteristics of the foods.

Moisture transport through polymer films is influenced by several polymer properties including chemical structure, method of polymer preparation, polymer processing condition, free volume, density, crystallinity, polarity, tacticity, crosslinking and grafting, orientation, presence of additives, and use of polymer blends. An increase in crystallinity, density, orientation, molecular weight or crosslinking results in decreased permeability of edible films.

Although capacitive (RF) dielectric heating systems have been used for heating foods in the past, there remains a need for improved methods and apparatuses to rapidly, efficiently and uniformly heat food products or parts of food products.

It has now been discovered that certain capacitive (RF) dielectric heating devices and/or methods can be used to rapidly, efficiently and/or uniformly heat food products, including conventional foods and seeds, as well as any related packaging, for safe pasteurization, sterilization and/or thawing.

BRIEF DESCRIPTION OF THE DRAWINGS

In the drawings:

FIG. 6 is a top plan view of a grid electrode, which may be used in the systems of FIGS. 5 and 9;

FIG. 7 is a sectional view taken along line 7—7 of FIG. 6;

FIGS. 8A–8D are block diagrams of four manufacturing process flows which benefit from use of a dielectric heating system;

FIGS. 12 and 13 are tables showing heating and germination rates for the seeds of first and second tests, respectively, described in Example 6.

FIG. 14 is a table showing microbial test results for the seeds of Example 6.

DETAILED DESCRIPTION

Figure 1:
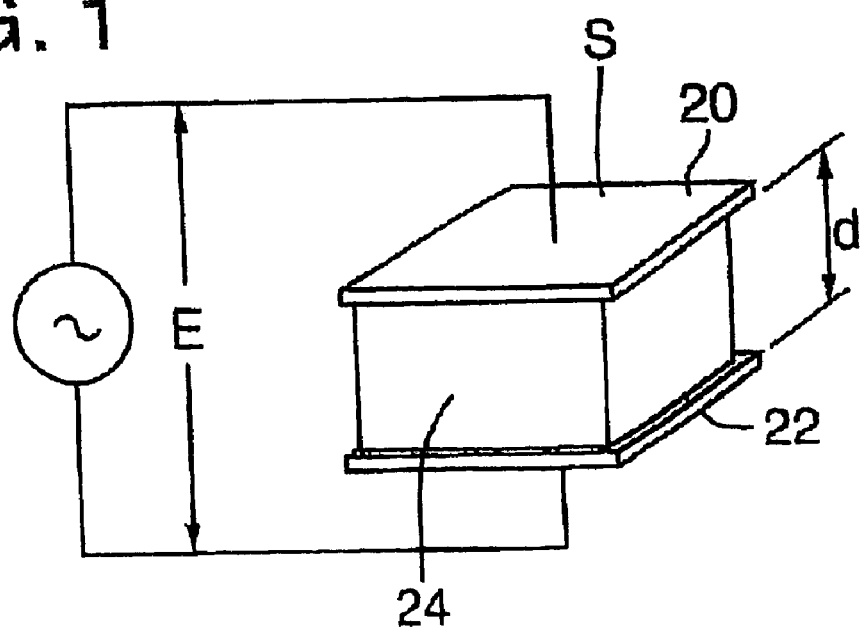
FIG. 1 is a schematic diagram of an existing capacitive (RF) dielectric heating system.

FIGS. 1–4 show an example of a known capacitive (RF) dielectric heating system. A high voltage RF frequency sinusoidal AC signal is applied to a set of parallel electrodes 20, 22 on opposite sides of a dielectric medium 24 as shown in FIG. 1. The medium 24 to be heated is sandwiched or placed between the electrodes 20, 22, in an area defined as the product treatment zone so that an AC displacement current flows through the medium 24 as a result of polar molecules in the medium aligning and rotating in opposite fashion to the applied AC electric field. Direct conduction does not occur but instead an effective AC current flows through the capacitor due to polar molecules with effective charges rotating back and forth. Heating occurs because these polar molecules encounter interactions with neighboring molecules resulting in lattice and frictional losses as they rotate.

Figure 2A:
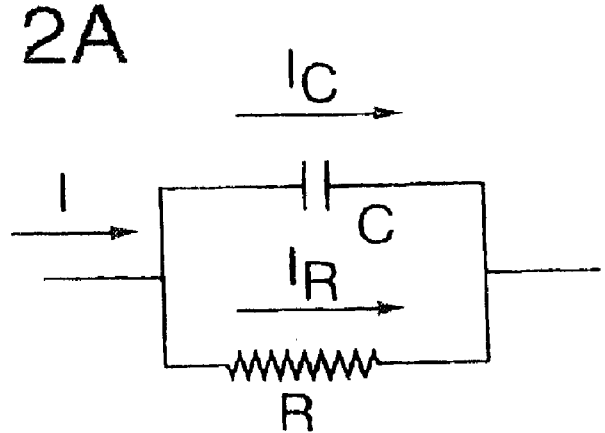
FIGS. 2A, 2B and 2C are equivalent circuit diagrams of the dielectric heating system of FIG. 1 for different types of food products.
Figure 2B:
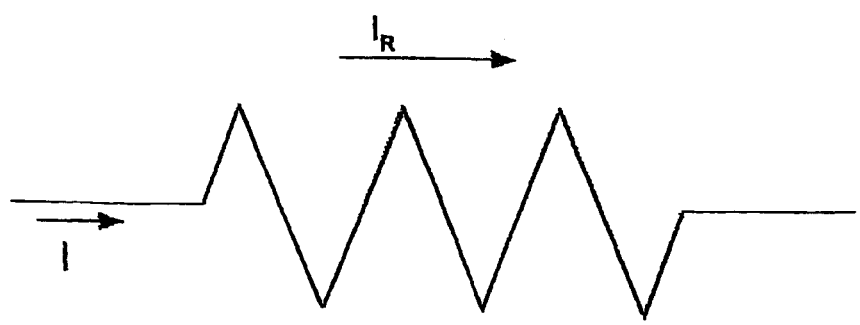

The resultant electrical equivalent circuit of the device of FIG. 1 is therefore a capacitor in parallel with a resistor as shown in FIG. 2A. There is an in-phase $I_R$ component and an out-of-phase $I_C$ component of the current relative to the applied RF voltage, and the in-phase component $I_R$ corresponds to the resistive voltage loss. These losses get higher as the frequency of the applied signal is increased for a fixed electric field intensity or voltage gradient due to higher speed interactions with the neighboring molecules. The higher the frequency of the alternating field, the greater the energy imparted into the medium 24 until the frequency is so high that the rotating molecules can no longer keep up with the external field due to lattice limitations.

This frequency, which is referred to as a "Debye resonance frequency" after the mathematician who modelled it, represents the frequency at which lattice limitations occur, and is the frequency at which the maximum energy can be imparted into a medium for a given electric field strength (and therefore the maximum heating). This high frequency limitation is inversely proportional to the complexity of the polar molecule. For example, proteins with amino acid polar side groups or chains have a slower rotation limitation, and thus lower Debye resonance, than simple polar water molecules. These Debye resonance frequencies also shift with temperature as the medium is heated.

Figure 2C:
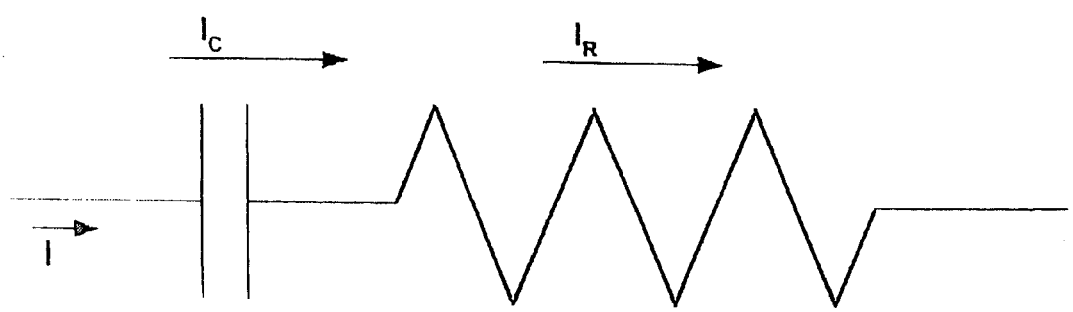

Some media may be represented by different resultant electrical equivalent circuits than the circuit shown in FIG. 2A. Media of interest in this application are food products, which are defined herein to include conventional foods, agricultural products from which foods are derived (e.g., seeds for sprouts), as well as other edible substances (e.g., edible films used to package seeds). For example, with surimi seafoods, which generally have a high moisture content (approximately 74–84%) and a high salt content (approximately 1–4%), the resultant electrical circuit is simply a resistor (FIG. 2B), because the ohmic properties dominate. For seeds, however, which have a much lower moisture content (approximately 3–6%), the resultant electrical circuit is a capacitor in series with a resistor (FIG. 2C).

Various other foods and food-type products may have different electrical circuit analogs. More complex models having serial and parallel aspects in combination to address second order effects are possible. Any of the components in any of the models may have temperature and frequency dependence.

Figure 3:
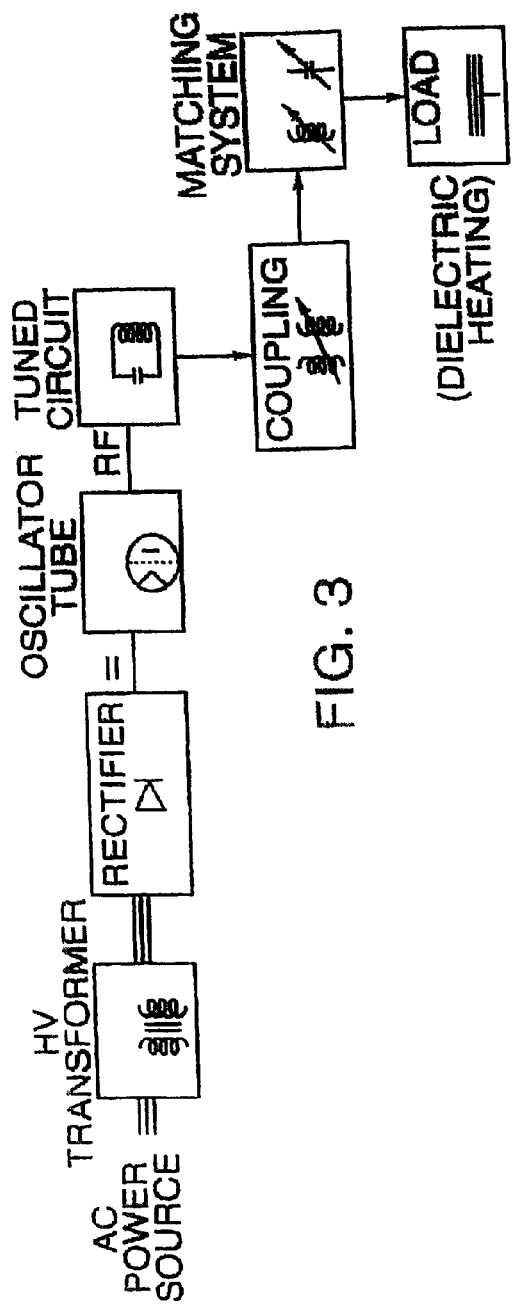
FIG. 3 is a block diagram of the dielectric heating system of FIG. 1.
Figure 4:
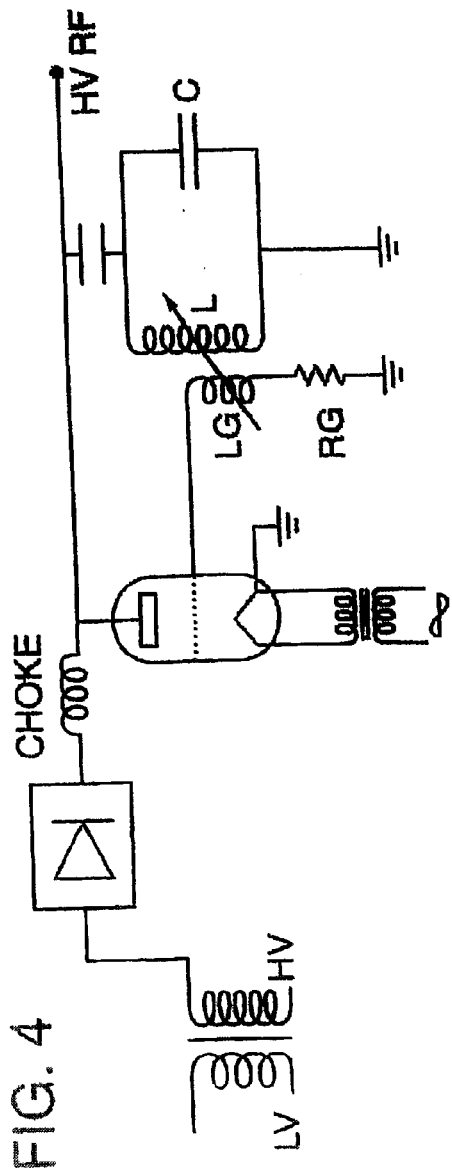
FIG. 4 is a block diagram showing the high power RF signal generation section of the dielectric heating system of FIG. 3 in greater detail.

An example of a conventional RF heating system is shown in FIGS. 3 and 4. In this system, a high voltage transformer/rectifier combination provides a high rectified positive voltage (5 kV to 15 kV) to the anode of a standard triode power oscillator tube. A tuned circuit (parallel inductor and capacitor tank circuit) is connected between the anode and grounded cathode of such tube as shown in FIG. 4, and also is part of a positive feedback circuit inductively coupled from the cathode to the grid of the tube to enable oscillation thereby generating the RF signal. This RF signal generator circuit output then goes to the combined capacitive dielectric and resistive/ohmic heating load through an adapter network consisting of a coupling circuit and a matching system to match the impedance of the load and maximize heating power delivery to the load, as shown in FIG. 3. An applicator includes an electrode system that delivers the RF energy to the medium 24 to be heated, as shown in FIG. 1.

The known system of FIGS. 1–4 can only operate over a narrow band and only at a fixed frequency, typically as specified by existing ISM (Industrial, Scientific, Medical) bands. Such a narrow operating band does not allow for tuning of the impedance. Any adjustment to the system parameters must be made manually and while the system is not operating. Also, the selected frequency can drift. Therefore, to the extent that the known system provides any control, such control is not precise, robust, real time or automatic.

New capacitive (RF) dielectric heating methods and systems described below provide improved overall performance and allow for more precise and robust control of the heating processes. With the new methods and systems, specific dielectric properties of food products are determined and/or used in the process, either directly as process control parameters or indirectly as by reference to a model used in the process that includes relationships based on the properties. New ways of using capacitive (RF) dielectric heating in the various phases of processing, packaging and preparing foods are disclosed. Two exemplary approaches are described in detail.

According to the first approach described in connection with the system shown in FIG. 5, a variable frequency RF waveform is generated, and the waveform is output to an amplifier and an impedance matching network to generate an electric field to heat the food. Based on at least the measured temperature of the food and one or more specific dielectric or ohmic properties of the food, the system is controlled to provide optimum heating. Multiple frequency power waveforms can be applied simultaneously.

Figure 9:
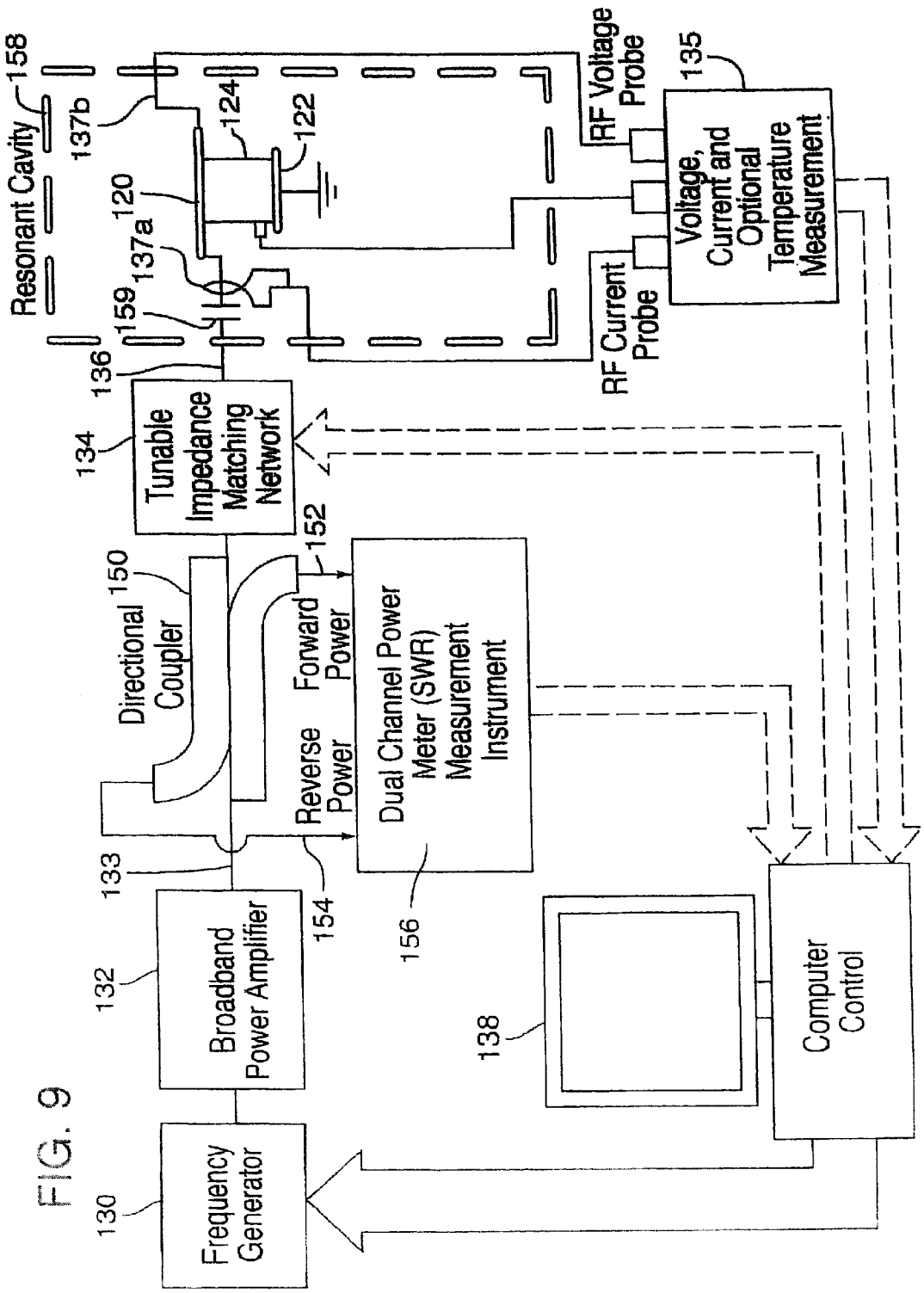
FIG. 9 is a block diagram similar to FIG. 5, except showing an alternative embodiment of a capacitive (RF) dielectric heating system.

According to the second approach, which is described primarily in connection with the system of FIG. 9, enhanced feedback provides for automatic impedance matching. By matching the impedance, maximum power is supplied to the load, and the maximum heating rate is achieved. In general, achieving the highest possible heating rate is desirable because higher heating rates tend to damage the food less (e.g., prolonged heating reduces moisture content in food). If impedance mismatch occurs, the rate at which the food product is heated decreases.

Specific implementations of each approach are discussed below, following sections on the characterization and monitoring of dielectric properties and impedance matching.

Characterization, Monitoring and Modeling

Characterization of dielectric properties vs. frequency and temperature assists in the design of a capacitive (RF) dielectric heating system to pasteurize, sterilize or thaw various foods by some methods of the present invention. It is usually desired to heat food, which may include pre-cooked food, without any objectionable degradation in quality, texture or taste. Thus, to aid in the selection of appropriate operating conditions, food samples are studied to assess the effects of RF energy on key properties of the food samples at various frequencies and temperatures. The results of these studies influence the design of capacitive dielectric heating systems.

In addition, a capacitive dielectric heater may be called on to heat a food product contained in packaging materials. Some packaging materials will degrade if overheated, whereas other packaging materials could be heated intentionally to transfer heat energy to a food product contained in the packaging. Therefore, the characterization of the dielectric properties of packaging materials and the effects of RF energy on those materials may be important in choosing the proper packaging materials and/or operating frequencies.

An electromagnetic/heat transfer mathematical model can be used to predict the dielectric heating characteristics of various foods and packaging materials. Such a model may involve 2-D and/or 3-D mathematical modeling programs as well as finite element methodologies to model composite materials. Best results are achieved with a model that integrates both electromagnetic and heat transfer principles.

To supply the AC displacement current at a needed frequency, variable components of the tunable RF signal generator circuit and associated matching networks are actively tuned to change frequency, or tuned automatically, or switched with a control system. Therefore, a software control system is also provided to set up the frequency profile. A variable frequency synthesizer or generator and a broadband power amplifier and associated matching systems and electrodes are useful components of such a capacitive dielectric heating system. In some implementations, temperature monitoring of the heated medium using thermal sensors or infrared scanners is conducted and data fed back into the control system and the generator's frequency groups are swept accordingly to track a parameter of interest, such as Debye resonances (explained below) or other dielectric property, or other temperature dependent parameters.

The key electromagnetic parameters of a medium to be tested are defined as follows:
$\sigma$=Electrical Conductivity (S/m) E=RMS Electric Field intensity (V/m)
$\in$=Electric Permittivity (F/m) H=RMS Magnetic Field Intensity (A/m)
$\mu$=Magnetic Permeability (H/m) B=Magnetic Flux Density (W/M$^2$)
The Permittivity and permeability can be divided into loss terms as follows:

$$\in = \in' - j\in'' \quad (1)$$

$$\mu = \mu' - j\mu'' \quad (2)$$

where
  $j = \sqrt{-1}$
  $\in'$=Energy Storage Term of the Permittivity
  $\in''$=Loss Term of the Permittivity
  $\mu'$=Energy Storage Term of the Permeability
  $\mu''$=Loss Term of the Permeability When analyzing the experimental data, the magnetic losses can be assumed equal to zero and for the most part frequency can be assumed high enough that the dielectric loss factor $\in''$ dominates over losses due to electrical conductivity $\sigma$ (i.e., where $\omega\in'' \gg \sigma$, with angular frequency $\omega = 2\pi f$, f being the frequency measured in Hz). (For surimi seafoods, however, testing has shown that electrical conductivity $\sigma$ dominates over dielectric loss in the 100 kHz to 300 MHz range.) The electrical conductivity $\sigma$ is measured and accounted for where needed (mainly at the lower end of the frequency range). With those assumptions in mind, the expressions for equivalent capacitance and equivalent resistance in FIG. 2 reduce to the following:

$$C = (\in' S)/d \quad (3)$$

$$R = d/(\omega \in'' S), \quad (4)$$

where S is the exposed area of the plates and d is the plate separation between electrodes.

As mentioned above, capacitive heating systems according to the present invention operate at frequencies in the Medium Frequency (MF: 300 kHz–3 MHz) and/or High Frequency (HF: 3 MHz–30 MHz) bands, and sometimes stretch into the lower portions of the Very High Frequency (VHF: 30 MHz–300 MHz) band. The frequency is generally low enough that the assumption can be made that the wavelength of operation is much larger than the dimensions of the food medium, thus resulting in highly uniform parallel electric field lines of force across the food medium.

Impedance Matching

Electrical "impedance" is a measure of the total opposition that a circuit or a part of a circuit presents to electric current for a given applied electrical voltage, and includes both resistance and reactance. The resistance component arises from collisions of the current-carrying charged particles with the internal structure of a conductor. The reactance component is an additional opposition to the movement of electric charge that arises from the changing electric and magnetic fields in circuits carrying alternating current. With a steady direct current, impedance reduces to resistance.

As used herein, "input" impedance is defined as the impedance "looking into" the input of a particular component or components, whereas "output" impedance is defined as the impedance "looking back into" the output of the component or components.

The heating load, or, more formally, the "actual load," is the combination of the medium (i.e., the food product and any packaging) and the surrounding structure, e.g., the capacitive electrodes and any electrode enclosure that may be present. Thus, as used herein, the "actual load impedance" is the input impedance looking into the actual load. The impedance of the medium is influenced by its ohmic and dielectric properties, which may be temperature dependent. Thus, the actual load impedance typically changes over time during the heating process because the impedance of the medium varies as the temperature changes.

The "effective adjusted" load impedance, which is also an input impedance, is the actual load impedance modified by any "impedance adjustments." In specific implementations, "impedance adjustments" include the input impedance of a tunable impedance matching network coupled to the load and/or the input impedance of a coupling network coupled to the structure surrounding the load (e.g., the electrodes and/or enclosure, if present). In these implementations, the "effective load" includes the impedance load of any impedance adjusting structures and the actual load. Other impedance adjustments that may assist in matching the effective adjusted load impedance to the signal generating unit output impedance may also be possible. The effective load impedance is the parameter of interest in the present impedance matching approach.

The signal generating unit, as used herein, refers to the component or components that generate the power waveform, amplify it (if necessary) and supply it to the load. In specific implementations, the signal generating unit includes a signal generator, an amplifier that amplifies the signal generator output and conductors, e.g. a coaxial cable, through which the amplified signal generator output is provided to the load.

The signal generating unit's impedance that is of interest is its output impedance. In specific implementations, the signal generating unit output impedance is substantially constant within the operating frequency range and is not controlled. Both the input impedance and the output impedance of the power amplifier, as well as the signal generator out impedance and the conductor characteristic impedance are substantially close to 50 ohms. As a result, output impedance of the signal generating unit is also substantially close to 50 ohms.

Thus, in specific implementations, matching the effective adjusted load impedance to the signal generating unit output impedance reduces to adjusting the effective adjusted load impedance such that it "matches" 50 ohms. Depending upon the circumstances, a suitable impedance match is achieved where the effective adjusted load impedance can be controlled to be within 25 to 100 ohms, which translates to nearly 90% or more of the power reaching the actual load.

Impedance matching is carried out substantially real-time, with control of the process taking place based on measurements made during the process. Impedance matching can be accomplished according to several different methods. These methods may be used individually, but more typically are used in combination to provide different degrees of impedance adjustment in the overall impedance matching algorithm:

1. The frequency of the signal generator may be controlled. In an automated approach, the signal generator frequency is automatically changed based on feedback of a measured parameter.

For example, the signal generator frequency may be changed based on the actual load temperature and predetermined relationships of frequency vs. temperature. The frequency may be changed to track Debye resonances as described above and/or to maintain an approximate impedance match. Typically, this serves as a relatively coarse control algorithm.

For more precise control, aspects of the power waveform supplied to the effective load can be measured, fed back and used to control the frequency. For example, the forward power supplied to the effective load and the reverse power reflected from the effective load can be measured, and used in conjunction with measurements of the actual voltage and current at the load to control the frequency.

2. A tunable matching network can be automatically tuned to adjust the effective load impedance to match the signal generating unit output impedance. In a first step, series inductance is used in the output portion of the impedance matching network to tune out the series capacitive component of the actual load impedance. The series inductance is set by measuring the initial capacitive component, which is determined by measuring the voltage and current at the actual load and determining their phase difference. It is also possible to measure the voltage and current within the matching network and control for a zero phase shift.

For more complex models of the load, other models will be necessary. An alternative approach would be to use a shunt inductor to tune out a shunt capacitive load.

Initially, the resulting effective load impedance will be purely resistive, but will likely differ from the desired 50 ohms level. In a second step, additional elements within the matching network are tuned to make the input impedance of the matching network, which is defined as the effective adjusted load impedance for a described implementation, match the desired 50 ohm target. The second step tuning is controlled based on the measured forward and reflected power levels.

3. It is possible to adjust the gap in a capacitive coupling network positioned at the load. Such adjustments could be made automatically during the heating process with a servo a motor.

4. It is possible to physically adjust the capacitive electrodes that are included as a part of the actual load to make minor adjustments to the actual load impedance. (Other adjustments are likely more easily controlled.)

Specific implementations that incorporate impedance matching are discussed in the following two sections.

First Approach

Figure 5:
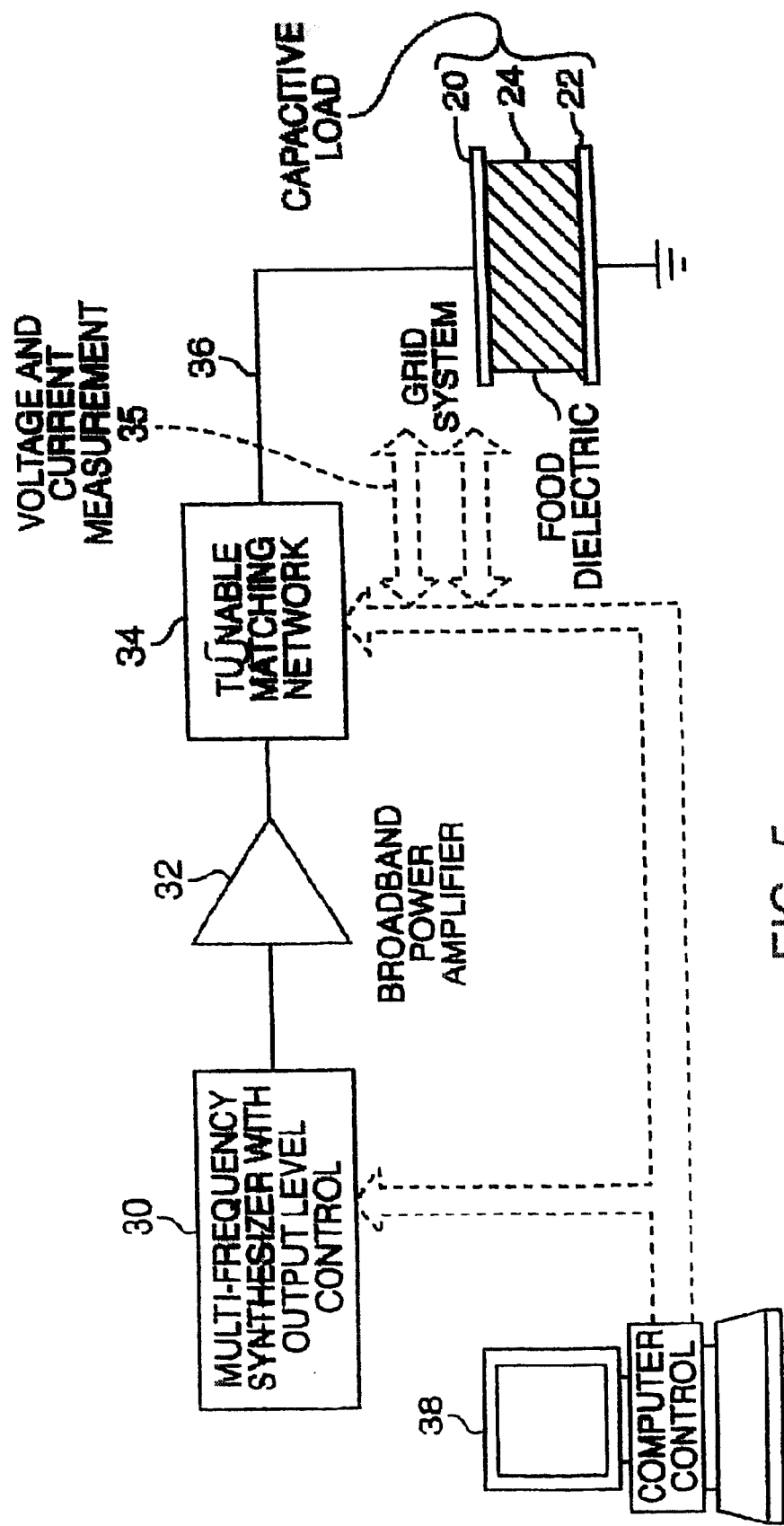
FIG. 5 is a block diagram of a capacitive (RF) dielectric heating system.

One exemplary system suitable for the first approach, in which at least the measured temperature of the food being heated is monitored, is shown in FIG. 5. The system of FIG. 5 includes a variable RF frequency signal generator 30 with output voltage level control, a broadband linear power amplifier 32, and a tunable impedance-matching network 34 (for fixed or variable frequency operation) to match the power amplifier output impedance to the load impedance of the capacitive load 20, 22, 24, that includes the medium 24 being heated.

The system is constructed to provide an AC RF signal displacement current 36 at an RF frequency in the range of 300 kHz to 300 MHz. This range includes the MF (300 kHz to 3 MHz), HF (3 MHz to 30 MHz), and VHF (30 MHz to 300 MHz) frequencies in the lower regions of the radio frequency (RF) range.

In the specific implementation shown in FIG. 5, the variable RF frequency signal generator 30 is a multi-RF frequency signal generator capable of simultaneously generating multiple different frequencies. Although a single frequency signal generator may be used, the multi-frequency signal generator is useful for methods in which frequency-dependent dielectric properties of the food or foods being heated are monitored and used in controlling the heating process, such as is explained in the following section.

Debye Resonance Frequency Implementations

As one example, the energy efficiency and/or heating rate are maximized at or near the location in frequency of a "Debye resonance" of the medium. In other specific implementations, dielectric properties other than Debye resonances are tracked and used in controlling capacitive (RF) dielectric heating, e.g., when Debye resonances are not present or are not pronounced. These other dielectric properties may be dependent upon frequency and/or temperature, similar to Debye resonances, but may vary at different rates and to different extents. Examples of such other dielectric properties are electrical conductivity and electrical permitivity.

In this example, the RF signal frequency is tuned to the optimal Debye frequency or frequencies of a component or components of the food product to be heated. Multiple Debye resonances may occur in a composite material. So, multiple composite frequency groups can be applied to handle the several Debye resonances. Also, the RF signal frequencies can be varied with temperature to track Debye frequency shifts with changes in temperature.

The RF frequency or composite signal of several RF frequencies is selected to correlate with the dominant Debye resonance frequency groups of the medium 24 that is being heated. These Debye resonances are dependent on the polar molecular makeup of the medium 24 and thus are researched for different types of food to appropriately program the heating system. The generation system, in this case the variable RF frequency signal generator 30, is capable of generating more than one frequency simultaneously. The control system for this heating system is capable of being set up or calibrated to be optimum for different types of food or other media.

The frequency or composite frequency groups of the RF signal used in the heating system will track with and change with temperature to account for the fact that the Debye resonance frequencies of the polar molecular constituents of the food or other medium 24 also shift with temperature.

With the most preferred apparatuses, the RF signal power level and resulting electric field strength can be adjusted automatically by a computer control system which changes the load current to control heating rates and account for different food geometries and packaging types. The power level is controlled by: (1) measuring the current and field strength across the actual load with voltage and current measurement equipment as indicated at 35 in FIG. 5; and (2) adjusting the voltage (AC field strength), which in turn varies the current, until measurements of the current and field strength indicate that the desired power level has been achieved. As shown in FIG. 5, the computer also controls the multi-frequency RF signal synthesizer 30 to change its frequency and to adjust the tunable impedance matching network 34.

Figure 10:
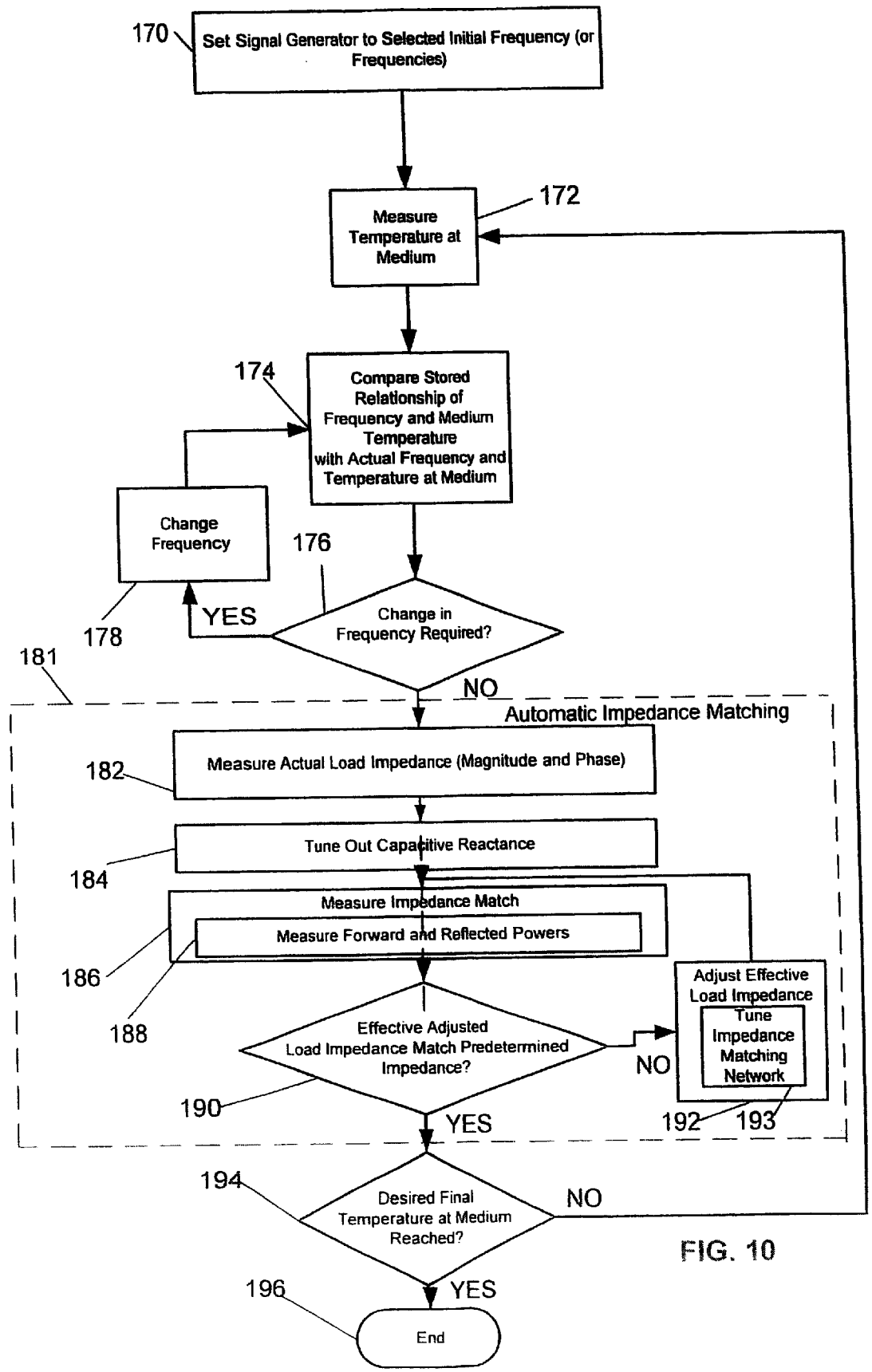
FIGS. 10 and 11 are flow charts illustrating steps of impedance matching methods for use in capacitive (RF) dielectric heating systems.

FIG. 10 is a flowchart showing another exemplary heating process according to the first approach in more detail.

In step 170, the signal generator 30 is set to an initial frequency or frequencies. For expository convenience, it is assumed in this example that a single frequency is set, but the description that follows applies equally to cases where multiple frequencies are set.

The set frequency may be selected with reference to a predetermined frequency or frequency range based on a known relationship between frequency and temperature. For example, the set frequency may be selected based on one or more Debye resonances of the medium as described above.

In step 172, the temperature at the medium is measured. In step 174, the measured temperature and set frequency are compared to a predetermined relationship of frequency and temperature for the medium. The relationship may be stored in the computer 38, e.g., in the form of a look-up table.

If the comparison between the set frequency and the predetermined frequency indicates that the set frequency must be changed (step 176; YES), the process advances to step 178, the set frequency is automatically changed by control signals sent to the signal generator 30, and step 174 is repeated. If no change in the set frequency is required (step 176; NO) the process advances.

As indicated by the dashed line, an automatic impedance matching process 181 follows step 176. For an exemplary implementation, automatic impedance matching begins with step 182. In step 182, the magnitude and phase of the actual load impedance are measured using the voltage and current measurement equipment 35, and the measured values are relayed to the computer 38. In step 184, the phase angle difference between the measured voltage and current is determined to tune out the reactance component of the impedance. One element of controlling impedance match is therefore to tune out the capicitive reactance component of the actual load resulting in zero phase shift between the voltage and current.

In step 186, the impedance match between the signal generating unit and the effective load is measured. Optionally, impedance match can be controlled through measuring the power waveforms supplied to and reflected from the effective load (the "forward and reverse powers") (optional sub-step 188), assuming the FIG. 5 system is configured to include a measurement instrument 156 and directional coupler 150 as shown in FIG. 9. (Measurement of the forward and reverse powers is described in the following section.)

Following completion of the step 186, the process advances to step 190. In step 190, the effective load impedance is compared to the predetermined impedance of the signal generating unit. If the impedance match is not sufficient, the process proceeds to step 192. If the impedance match is sufficient, the process proceeds to step 194.

In step 192, the effective load impedance is adjusted. In the implementation of FIG. 5, the effective load impedance is adjusted by automatically tuning the tunable impedance matching network 34 based on control signals sent from the computer 38 (step 193). Following step 192, the process returns to step 186.

In step 194, the measured temperature is compared to a desired final temperature. If the measured temperature equals or exceeds the desired final temperature, the heating process in completed (step 196). Otherwise, heating is continued and the process returns to step 172.

Heating to pasteurization and sterilization temperatures can be rapid with increased rates resulting in decreased degradation of food quality (e.g., protease enzyme in seafoods inactivated). The rapid heating capability is due to the same uniform heating advantage described above and the maximum power input to the heated load by the matching of generator frequency or composite of frequencies to the Debye resonance frequency groups of the various food products and/or packaging, and tracking those Debye resonance frequency groups with temperature. Power control capability of the generator/heating system allows for the ability to set heating rates to optimize heating processes.

In some implementations, higher overall energy efficiency is obtained by matching the generator frequency or composite of frequencies of the RF waveform to the Debye resonance frequency groups of the various food products and by tracking those resonances with temperature resulting in a shorter heating time per unit volume for a given energy input.

Complete control of the heating process is achieved by the selective heating of various constituents of the medium, including the food product and/or packaging material. Protein molecules contain peptide chains with amino-acid side groups that often are polar. In addition various hydrated interfaces (bound water) of complex tissue molecules can also be polar. For example, in implementations where Debye resonances are monitored, this technology can be set up to target the Debye resonances of those constituents of food for which heating is desired and avoid the Debye resonances of other constituents (e.g., packaging materials) of which heating is not desired by setting the generator frequency or frequency groups of the RF waveform to target the appropriate Debye resonances and track them with temperature and avoid other Debye resonances.

Heating rates can be increased by the matching of the generator frequency or composite of frequencies of the RF waveform to the Debye resonance frequency groups of the various heated media and tracking those Debye resonance frequency groups with temperature.

Overall energy efficiency is improved due again to the matching of the generator frequency or composite of frequencies to the Debye resonance frequency groups of the various heated media and tracking those Debye resonance frequency groups with temperature. Efficiency is also improved by selective heating of the various individual constituents of a medium (e.g., glue between layers of plastic packaging laminates) by targeting the Debye resonance profiles of those constituents and setting up the generator to excite them and track them with temperature.

The characterization of the dielectric properties of food as a function of frequency and temperature and the search for Debye resonances of the various food constituents are of great interest. If sufficient information is available, the heating apparatus can be programmed with great precision. Such information can be obtained by conducting preliminary experiments on food products of the type to be heated.

Several of the Examples relate to testing involving aspects of the first approach.

Second Approach

According to the second approach, enhanced feedback and automatic control are used to match the effective adjusted load impedance with the output impedance of a signal generating unit that produces an amplified variable frequency RF waveform.

The system of FIG. 9 is similar to the system of FIG. 5, except that the system of FIG. 9 provides for direct measurement of the power output from the amplifier, and this result can be used to match the load impedance to the signal generating unit output impedance, as is described in further detail below. Specifically, the system of FIG. 9 provides for measuring the forward and reflected power, as well as the phase angle difference between the voltage and the current.

Also, the temperature of the medium during the process is not used as a variable upon which adjustments to the process are made, although it may be monitored such that the process is ended when a desired final temperature is reached. Elements of FIG. 9 common to the elements of FIG. 5 are designed by the FIG. 5 reference numeral plus 100.

Similar to FIG. 5, FIG. 9 shows a variable RF frequency generator 130 connected to a broadband linear power amplifier 132, with the amplifier 132 output being fed to a tunable impedance matching network 134. As in the case of the amplifier 32, the amplifier 132 is a 2 kW linear RF power amplifier with an operating range of 10 kHz to 300 MHz, although a 500 W–10 kW amplifier could be used. Positioned between the amplifier 132 and the matching network 134 is a tunable directional coupler 150 with a forward power measurement portion 152 and a reverse power measurement portion 154.

The tunable directional coupler 150 is directly connected to the amplifier 132 and to the matching network 134. The forward and reverse power measurement portions 152, 154 are also each coupled to the connection 133 (which can be on a coaxial transmission line) between the amplifier 132 and the matching network 134 to receive respective lower level outputs proportional to the forward and reverse power transmitted through the connection 133. These lower level outputs, which are at levels suitable for measurement, can be fed to a measurement device 156.

If a 25 W sensor is used in each of the forward and reverse power measurement portions 152, 154, the measurement capability for forward and reverse power will be 2.5 kW with a coupling factor of −20 dB.

The measurement device 156 allows a voltage standing wave ratio (SWR) to be measured. The voltage SWR is a measure of the impedance match between the signal generating circuitry output impedance and the effective load impedance.

As described above, the matching network 134 can be tuned to produce an impedance adjustment such that the effective adjusted load impedance matches the signal generating circuitry output impedance. A voltage SWR of 1:1 indicates a perfect match between the signal generating circuitry output impedance and the effective load impedance, whereas a higher voltage SWR indicates a poorer match. As alluded to above, however, even a voltage SWR of 2:1 translates into nearly 90% of the power reaching the load.

The measurement device 156 can also determine the effective load reflection coefficient, which is equal to the square root of the ratio of the reverse (or reflected) power divided by the forward power. In specific implementations, the measurement device 156 can be an RF broadband dual channel power meter or a voltage standing wave ratio meter.

Alternatively or in addition to the methods described above, it is also possible to provide for control heating by controlling for a minimum reflected power, e.g., a reflected power of about 10% or less of the forward power.

Similar to FIG. 5, an AC RF power waveform 136 is fed from the network 134 to the load, which includes electrodes 120, 122 and a medium 124 to be heated in the product treatment zone between the electrodes 120, 122. As in FIG. 5, the system of FIG. 9 includes voltage and current measurement equipment, indicated in FIG. 9 at block 135, to measure the voltage applied across the capacitive load and current delivered to the capacitive load, which can be used to determine load power and the degree of impedance match. The voltage, current and optional temperature measurement block 135 includes inputs from an RF current probe 137a, which is shown as being coupled to the connection between the network 134 and the electrode 120, and an RF voltage probe 137b, which is shown as being connected (but could also be capacitively coupled) to the electrode 120. As indicated, there may be an additional sensor for measuring the temperature or other suitable environmental parameter at the medium. Superior results are achieved with probes 137a and 137b that are broadband units, and a voltage probe 137b that has a 1000:1 divider. A capicitively coupled voltage probe with a divider having a different ratio could also be used.

The voltage and current measurements are also used in determining the effect of capacitive reactance. Capacitive reactance in a circuit results when capacitors or resistors are connected in parallel or series, and especially when a capacitor is connected in series to a resistor. The current flowing through an ideal capacitor is −90° out of phase with respect to an applied voltage. By determining the phase angle between the voltage and the current, the capacitive reactance can be "tuned out" by adjusting the tunable network 134. Specifically, inductive elements within an output portion of the tunable matching network 134 are tuned to tune out the capacitive component of the load.

Signals from the probes 137a, 137b indicate the current delivered to the capacitive load and voltage applied across the load, respectively, to the computer 138. The block 135 includes a computer interface that processes the signals into a format readable by the computer 138. The computer interface may be a data acquisition card, and may be a component of a conventional oscilloscope. If an oscilloscope is used, it can display one or both of the current and voltage signals, or these signals may be displayed by the computer.

The system of FIG. 9 includes feedback control as indicated by the arrows leading to and from the computer 138. Based on input signals received from the measurement instrument 156 and the block 135 and algorithms processed by the computer 138, control signals are generated and sent from the computer 138 to the frequency generator 130 and the matching network 134.

The control algorithm executed by the computer may include one or more control parameters based on properties of the specific food product being heated, as well as the measured load impedance, current, voltage, forward and reverse power, etc. For example, the algorithm may include impedance vs. temperature information for the specific food product as a factor affecting the control signal generated to change the frequency and/or to tune the impedance matching network.

Figure 11:
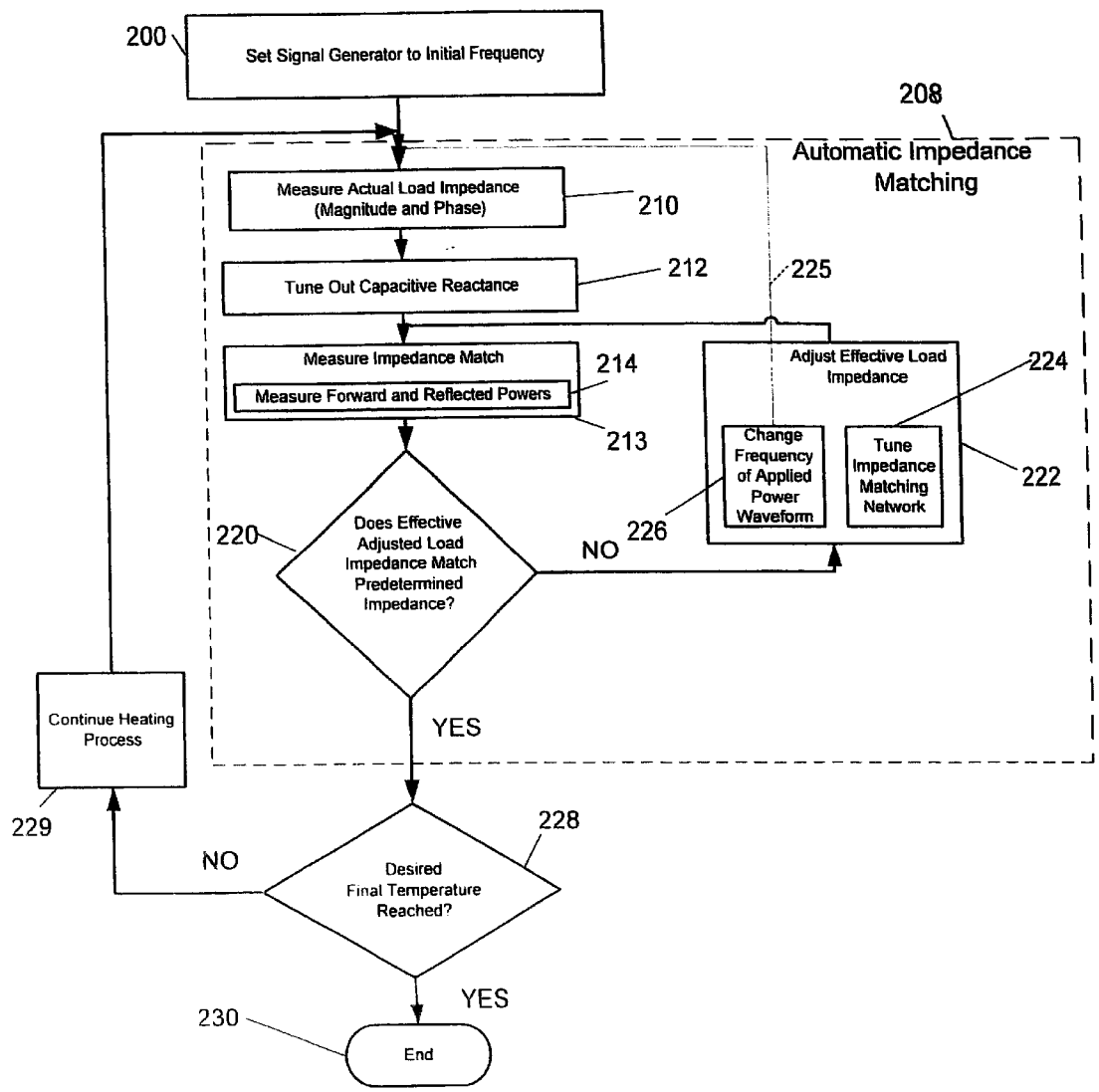

FIG. 11 is a flowchart illustrating steps of capacitive (RF) heating methods using impedance matching techniques.

In step 200, the signal generating unit is set to an initial frequency, which, as in the case of step 170 in FIG. 10, may be based on a predetermined frequency vs. temperature relationship, and the heating process is initiated.

As indicated by the dashed line, an automatic impedance matching process 208 follows step 200. For an exemplary implementation, automatic impedance matching begins with step 210. In step 210, the magnitude and phase of the actual load impedance are measured using the voltage and current measurement equipment 135, and the measured values are relayed to the computer 138. In step 212, the phase angle difference between the measured voltage and current is determined to tune out the reactance component of the impedance.

In step 213, the impedance match between the signal generating unit and the effective load is measured. For this implementation, measuring the impedance match includes measuring the forward and reverse powers (sub-step 214), and a voltage SWR is calculated as described above. The calculated voltage SWR is fed back to the computer 138.

In step 220, the effective load impedance is compared to the impedance of the signal generating unit, which is a constant in this example. If the match is not sufficient, e.g., as determined by evaluating the voltage SWR, the process proceeds to step 222. If the impedance match is sufficient, the process proceeds to step 228.

In step 222, the effective load impedance is adjusted. As described above, adjusting the effective load impedance, i.e., raising or lowering it, may be accomplished in two ways. As shown in sub-step 224, the impedance matching network (e.g., the network 134) can be tuned to produce an impedance adjustment such that the effective adjusted load impedance matches the signal generating unit output impedance. As an alternative to, or in conjunction with sub-step 224, the frequency at which the RF waveform is applied can be changed (sub-step 226) to cause a change in the effective adjusted load impedance. If the frequency is changed, it may be necessary to tune out the capacitive reactance again by repeating steps 210 and 212, as indicated by the control line 225 leading from sub-step 226 to step 210, before reaching step 213. If step 222 involves only tuning the impedance matching network, the process can return directly to step 213.

Step 228 is reached following a determination that an acceptable impedance match exists. In step 228, a monitored temperature is compared to a desired final temperature. If the measured temperature equals or exceeds the desired final temperature, the heating process in completed (step 230). Otherwise, heating is continued (step 229) and the process returns to step 210.

The feedback process of steps 210, 220 and 222 continues at a predetermined sampling rate, or for a predetermined number of times, during the heating process. In specific implementations, the sampling rate is about 1–5 s. Thus, as the food product is heated, the change in effective adjusted load impedance is periodically monitored and automatically adjusted to the constant signal generating unit output impedance, thereby ensuring that maximum power is used to heat the food product. As a result, the food product is heated quickly and efficiently.

The measured temperature may be used as an added check to assist in monitoring the heating process, as well as for establishing temperature as an additional control parameter used in controlling the process, either directly or with reference to temperature-dependent relationships used by the control algorithm.

To permit operation of the system on non-ISM (Industrial, Scientific and Medical) RF bands, shielding can be used to isolate various components of the system from each other and the surrounding environment. For example, as shown schematically in FIG. 9, a resonant cavity 158 can be provided to shield the capacitive load and associated circuitry from the surroundings. Other components may also require shielding.

Shielding helps prevent interference. Even though the frequency changes during the heating process, it resides at any one frequency value long enough to require shielding. An alternative approach is to use dithering (varying the frequency very quickly so that it does not dwell and produce sensible radiation) or spread the spectrum to reduce the shielding requirement.

As shown in FIG. 9, a secondary impedance matching device, e.g., a capacitive coupling network 159, is connected in series between the network 134 and the electrode 120. Varying the capacitance of the capacitance coupling network aids in impedance matching.

A conventional servo motor (not shown) may be connected to the capacitor coupling network to change its capacitance. The servo motor may be connected to receive control signals for adjusting the capacitance from the computer 138. Generally, the capacitance coupling network 159 is used for relatively coarse adjustments of load impedance.

A network analyzer (not shown) may also be used in determining impedance levels. Usually, the network analyzer can only be used when the system is not operating. If so, the system can be momentarily turned off at various stages in a heating cycle to determine the impedance of the capacitive load and the degree of impedance matching at various temperatures.

System Components

Suitable components for the systems of FIG. 5 and FIG. 9 are available from or are likely to be designed by:
National Instruments—GPIB (IEEE 488) data acquisition interface card for computer system
Agilent Technologies—frequency generator 8648B (9 Khz–4 Ghz) with option 1 EA (high power), oscilloscope 54615B (2 channel 500 Mhz) or 54602B (4 Channel 150 Mhz), E4419B dual channel RF power meter, 8753ES Network Analyzer 30 kHz–6 Ghz with Option 006, 8482B 25 W sensors (100 khz–4.2 Ghz) for directional coupler
Kalmus—power amplifier
Heatwave Drying Systems, Ltd., with consulting assistance from Flugstad Engineering—directional coupler, tunable matching network, resonant cavity, electrodes Flugstad Engineering/Oregon State University—software for measurement and control algorithms and hardware for interfacing computer system with network, voltage and current measurement equipment and measurement device Tektronix—Model A6312 current probe (DC 200 MHz, measurement capability to 40 A peak-to-peak, used with AM3050 GPIB-based current probe amplifier) and Model P6015A voltage probe (1000:1 20 kV DC/40 kV pulse peak, DC bandwidth 75 MHz) or Model P5100 voltage probe (100:1 2.5 kV, DC bandwidth 250 MHz)

Electrode Construction

As shown in FIGS. 6–7, the systems of FIG. 5 or FIG. 9 can employ gridded heating electrodes on the capacitive load for precise control of heating of the food medium 24 by the computer 38, especially to assist with heating heterogeneous media. At least one of the electrodes, for example top electrode 20 in the embodiment of FIGS. 6–7, has a plurality of electrically-isolated electrode elements 40. The bottom electrode 22 also has multiple electrically-isolated electrode elements 44. Most favorably, each top electrode element 40 is located directly opposite a corresponding bottom electrode element 44 on the other electrode. A plurality of switches 46, under control of the computer 38, are provided to selectively turn the flow of current on and off between opposing pairs of electrode elements 40, 44. And/or, an individual computer-controlled variable resistor (not shown) can be included in the circuit of each electrode pair, connected in parallel with the load, to separately regulate the current flowing between the elements of each pair. These arrangements provide the ability to heat individual areas of a food product at different rates than others and to protect against thermal runaway or "hot spots" by switching out different electrode element pairs for moments of time or possibly providing different field strengths to different portions of the sample.

It is also advantageous to provide one or more heat sensors on at least one of the electrodes 20, 22. FIGS. 6–7 show a compact arrangement where multiple spaced heat sensors 42 are interspersed between the electrode elements 40 of the top electrode 20. The thermal sensors 42 acquire data about the temperatures of the food sample 24 at multiple locations, which data is sent as input signal to the computer 38. The computer uses the data from each sensor to calculate any needed adjustment to the frequency and power level of the current flowing between pairs of electrode elements located near the sensor and produces corresponding output control signals which are applied to the RF signal generator 30, network 34, and switches 46.

The electrodes should be made of an electrically conductive and non-corrosive material, such as stainless steel or gold, that is suitable for use in a food processing apparatus. The electrodes can take a variety of shapes depending on the shape and nature of the food product to be processed and its packaging. A goal in choosing the shape of the electrodes is to conform the shape of the electrodes to the shape of the item to be processed, so as to minimize air gaps. Although FIGS. 6–7 show a preferred embodiment of the electrodes; other arrangements of electrode elements and sensors could be used with similar results or for special purposes.

Packaging Considerations

To design satisfactory packaging materials for food to be heated by a capacitive (RF) dielectric heating system according to the present invention, it is best to consider factors such as electric field levels, frequency schedules, geometries, and surrounding media. In particular, it is helpful to have a full understanding of dielectric properties of packaging materials and the food product to be heated, over a range of frequencies and temperatures. And, it is important to avoid any factors that may cause high local intensities of field strength or high local concentrations of lossy materials, the latter of which could be caused by saline moisture accumulation in the corners of vacuum packages, because salty water is more lossy than other components of the food.

It is possible to select packaging materials that are essentially transparent to the RF energy over all or a portion of the 1 MHz–300 MHz normal operating range, so that heating of the food can be accomplished without injuring the packaging.

The capacitive (RF) dielectric heating system is particularly useful to heat food products inside packaging that comprises multiple polymers having different properties at different stages in the food processing flow.

Multiple design methodologies can be used to take advantage of the sealing and preservation characteristics of certain plastic polymers used in combination with plastic polymer components that are RF insensitive. A multiple-staged process could occur where the product is packaged first with RF insensitive materials and then run through the capacitive (RF) heating pasteurization process and then in turn packaged with another layer of a different polymer that has better sealing or preservation characteristics. A variety of sealing and bonding methods can be used for laminated plastic packaging materials. Packaging materials can be chosen or modified to make bonding agents or bonding zones of laminated plastics more insensitive to the effects of RF exposure.

The product to be heated can be surrounded with a non-conductive dielectric coupling medium (e.g., de-ionized water) that itself will not be heated (Debye resonance at much higher frequency) but will increase the dielectric constant of the gaps between the electrodes and the medium to be heated thus lowering the gap impedance and improving energy transfer to the medium.

It may also be helpful to supply greater heat to outer edges of the medium (e.g. by convection from pre-heated deionized water) to help compensate for the greater heat losses that occur in those areas. The pre-heated water may be at a temperature of 75–80 degrees C.

EXAMPLES

Following are examples that describe how to devise particular apparatuses, data tables, algorithms and operating procedures.

Example 1

Tests can be conducted to measure and characterize dielectric properties, including Debye resonances, of various constituents of muscle foods and potential packaging materials, as functions of frequency (100 Hz–100 MHz) and temperature (0–90° C.).

The experiments are to measure the impedance (parallel capacitor and resistor model) of muscle food samples, and potential packaging materials sandwiched in a parallel electrode test fixture placed within a temperature/humidity chamber. The equipment used for these experiments is as follows:

| | |
|---|---|
| HP 4194A: | 100 Hz–100 MHz Impedance/Gain-Phase Analyzer |
| HP 41941A: | 10 kHz–100 MHz RF Current/Voltage Impedance Probe |
| HP 16451B: | 10 mm, 100 Hz–15 MHz Dielectric Test Fixture for 4-Terminal Bridge |
| HP 16453A: | 3 mm, 100 Hz–100 MHz RF/High Temperature Dielectric Test Fixture |
| Damaskos Test, Inc. | Various specially-designed fixtures |
| Dielectric Products Co. | 9 mm, 100 Hz–1 MHz Sealed High Temperature Food/Semi-Solids LD3T Liquid-Tight Capacitive Dielectric Test Fixture |
| HP 16085B: | Adapter to mate HP16453A to HP 4194A 4-Terminal Impedance Bridge Port (40 MHz) |
| HP 16099A: | Adapter to mate HP16453A to HP 4194A RF IV Port (100 MHz) |
| Temperature/ Humidity Chamber | Thermotron Computer Controlled Temperature/Humidity Chamber −68–+177° C., 10%–98% RH, with LN2 Boost for cooling |

Each of the capacitive dielectric test fixtures is equipped with a precision micrometer for measuring the thickness of the sample, critical in calculating the dielectric properties from the measured impedance. The different test fixtures allow for trading off between impedance measurement range, frequency range, temperature range, sample thickness and compatibility with foods/semi-solids and liquids.

Various samples of comminuted muscle are prepared to have moisture and salt contents representative of commercial products (e.g., 78% and 84% moisture content and 0%, 2% and 4% salt content for surimi seafoods). Three different moisture and salt content values covering both ends of these ranges and a mid-range value are chosen for the samples. A minimum of four replications of each muscle food type and preparation are tested with each dielectric probe for a total of 12 test cases for each muscle food type or preparation. Different groups of 4 replicated samples are prepared in advance to be compatible with one of the three dielectric probes. In addition to the "macroscopic" samples making up commercial food products, properties are evaluated on such individual constituents as starch, water, and sugar. These find application in later stochastic food property models.

The frequency range has been chosen to cover the typical industrial capacitive heating range (300 kHz to 100 MHz) as well as the lower frequencies (down to 100 Hz) to determine DC or low frequency electrical conductivity. This range also identifies Debye resonance locations of the packaging materials and very complex polar sidechains in the food (e.g., protein molecules-peptide chains with amino acid residues in the side groups). The temperature range of 0° C. to 90° C. has been chosen to overlap the likely pasteurization temperature range of 20° C. to 85° C.

Impedance is measured on the samples (both shunt resistance and capacitance) and then electric permittivity ∈', permittivity loss factor ∈" and electrical conductivity σ is calculated based on the material thickness, test fixture calibration factors (Hewlett Packard. 1995. *Measuring the Dielectric Constant of Solid Materials-HP 4194A Impedance/Gain-Phase Analyzer*. Hewlett Packard Application Note 339-13.) and swept frequency data. For details on the technical background covering the dielectric properties of foods including Debye resonances, please refer to the following discussion for Example 2.

Example 2

A mathematical model and computer simulation program can model and predict the capacitive heating performance of packaged comminuted muscle foods based on the characterized dielectric properties.

There are underlying mathematical models that form the basis of the overall simulation. The electric permittivity has been classically modeled using Debye equations (Barber, H. 1983. *Electroheat*. London: Granada Publishing Limited; Metaxas, A. C. and Meredith, R. J. 1983. In *Industrial Microwave Heating*. Peter Peregrinus Ltd.; Metaxas, A. C. and Meredith, R. J. 1983. In *Industrial Microwave Heating*. Peter Peregrinus Ltd.; and Ramo, S., J. R. Whinnery, and T. Van Duzer. 1994. *Fields and Waves in Communications Electronic*, 3$^{rd}$ edition. New York: John Wiley & Sons, Inc.). These equations can be used to model a variety of relaxation processes associated with dielectric alignments or shifts in response to external varying electric fields. Each of these alignment processes has a corresponding relaxation time $T_0$ that is a function of several parameters of the atomic and molecular makeup of a medium, and therefore is a measure of the highest frequency for which these phenomena can occur. At a frequency which equals $\frac{1}{2}\pi T_0$, a Debye Resonance occurs which results in a peak in the loss factor ∈". A model for the permittivity using a Debye function for a single relaxation process is shown in Equation (5):

$$\varepsilon = \varepsilon_0 \left[ \varepsilon_\infty + \frac{\varepsilon_d - \varepsilon_\infty}{1 + j\omega T_0} \right] \quad (5)$$

where
∈$_d$=Low Frequency Dielectric Constant of a Medium (f<<Debye Resonance).
∈$_\infty$=High Frequency Dielectric Constant of a Medium (f>>Debye Resonance).
∈$_0$=Permittivity of Free Space (8.854e-12 F/m).

Therefore, from Equation (1) it can be shown that the real and imaginary components of the permittivity are given for a single Debye resonance as follows:

$$\varepsilon' = \varepsilon_0 \left[ \varepsilon_\infty + \frac{\varepsilon_d - \varepsilon_\infty}{1 + \omega^2 T_0^2} \right] \quad (6)$$

$$\varepsilon'' = \frac{\omega T_0 \varepsilon_0 (\varepsilon_d - \varepsilon_\infty)}{1 + \omega^2 T_0^2} \quad (7)$$

∈$_d$ is typically an order of magnitude or more larger than ∈$_\infty$, and so from inspection of equations (6) and (7), it is seen that in the vicinity of a Debye resonance, ∈' drops off rapidly and there is a peak in the loss factor ∈". When a composite medium containing multiple relaxation times exists, then the more general purpose model can be represented as a summation of Debye terms as given by Equation (8) (loss term only) (Metaxas and Meredith, 1983):

$$\varepsilon'' = \sum_{\tau=\tau_0}^{\tau_n} g(\tau) \left( \frac{\omega \tau}{1 + \omega^2 \tau^2} \right) \Delta \tau \quad (8)$$

where g(τ) is the fraction of orientation polarization processes in each interval Δτ.

This summation assumes a linear combination of polarizations or Debye resonances. More complex mathematical models also exist for multiple Debye resonances if linearity is not assumed, and for complex composite dielectric materials with varying geometrical arrangements of the constituents (Neelakanta, P. S. 1995. *Handbook of Electromagnetic Materials. Monolithic and Composite Versions and Their Applications*. New York: CRC Press). In the case of heterogeneous foods, stochastic variables need to be included to model the relative concentrations and spatial distributions of the various constituents, and a Monte Carlo analysis performed to determine the statistical composite dielectric behavior in each block of a 3-D finite element partitioning model of the medium.

It can be shown (Roussy, G., J. A. Pearce. 1995. *Foundations and Industrial Applications of Microwaves and Radio Frequency Fields. Physical and Chemical Processes.* New York: John Wiley & Sons; Barber, 1983; Metaxus and Meredith, 1983) that the power per unit volume ($P_V$) delivered to a medium for a given electric field intensity is represented by the following:

$$P_V = Q_{gen} = (\omega \in '' + \sigma)|E|^2 \qquad (9)$$

This reduces to the following when $\omega \in '' >> \sigma$:

$$Q_{gen}(x,y,z,t) = P_V = E^2 \omega \in '' \qquad (10)$$

where E is again the RMS value of the electric field intensity. So for a given electric field intensity, peaks in the permittivity loss factor $\in ''$ results in peaks in the energy imparted to a medium, resulting in more efficient and rapid heating. Assuming for the moment that there is no heat transfer into or out of a medium due to convection or conduction, the heating time $t_h$ for a given temperature rise ($\Delta T$) due to dielectric heating is then given by Equation (11) (Orfeuil, 1987):

$$t_h = \frac{C_p \rho \Delta T}{E^2 \omega \varepsilon''} = \frac{C_p \rho \Delta T}{P_v} \qquad (11)$$

where $C_P$ = Specific Heat of the Medium (J/Kg ° C.)

$\rho$ = Density of Medium (Kg/m$^3$)

and all the other parameters are as previously defined.

The more general purpose conservation of energy equation that accounts for heat transfer (convection or conduction from adjacent areas) and heat generation (dielectric heating source term) is given as follows (Roussy and Pearce, 1995):

$$\rho C_p \frac{\partial T}{\partial t} - \nabla \cdot (k_T \nabla T) = Q_{gen}(x, y, z, t) \qquad (12)$$

where $K_T$ = thermal conductivity of the medium and t = time; all other parameters are as previously defined.

In a similar fashion, the general purpose governing equation solving for the electric field (from Maxwell's equations in differential form) is as follows (Roussy and Pearce, 1995):

$$\nabla^2 V - \mu \varepsilon \frac{\partial^2 V}{\partial t^2} = -\frac{\rho_v}{\varepsilon} \qquad (13)$$

where $\tau_V$ = Charge Density; V = Electric Potential or Voltage

Equation (13) is also referred to as the Helmholtz equation, and in cases where the time derivative is zero, it reduces to Poisson's Equation.

When the medium is a passive source-less medium such as food and when the frequency of operation is low enough where the wavelength is long compared to sample dimensions such as in the case of capacitive heating (i.e., quasi-static model), Equation (13) reduces to the following:

$$\nabla^2 V = 0 \qquad (14)$$

The electric field is related to the voltage by the following equation:

$$E = -\nabla V \qquad (15)$$

Or simply stated, the electric field is the negative gradient of voltage in three dimensions.

Equations (8), (9), (12), (14) and (15) form the basis for an electromagnetic dielectric heating model which can be applied to a composite dielectric model, to model a food substance having several subconstituents.

In addition, it is possible to make a composite series model for a food sample sandwiched top-and-bottom by a packaging layer, an air or water layer, and electrodes. From earlier discussion it is apparent that the dielectric parameters are all functions of temperature and frequency. It is also true from Equations (9) and (10) that the power generated for heating is a function of the dielectric loss factor and electric field intensity. Finally it can be deduced from Equations (13)–(15) that the electric field intensity is a function of the dielectric parameters which in turn are functions of temperature and frequency. Therefore an iterative solving algorithm can be developed to solve for all the desired parameters in this model, one that also sequences in time, cycling back and forth between the electromagnetic and thermal solutions and solves them as a function of frequency.

There are several options for developing a simulation model. One is to adapt existing electromagnetic models developed in MathCAD and MATLAB. Another is to employ various examples of electromagnetic field FEM programs for complex composite geometrical structures, such as the High Frequency Structure Simulator (HFSS) developed by Agilent Technologies and the Maxwell Extractor electromagnetic field solver programs developed by Ansoft, Inc. of Pittsburgh, Pa. HeatWave Drying Systems, Ltd., working with Dr. W. Hoefer at the University of Victoria, has developed a third approach to solve for both the electromagnetic and thermal processes (Herring, J. L., W. J. Hoefer, and R. L. Zwick. 1995. Time Domain Transmission Line Matrix (TLM) Modeling of a RF/Vacuum Wood Drying Kiln. Progress in Electromagnetic Research Symposium. Seattle, Wash.). One can start with this 3-D TLM electromagnetic field solver which has already been combined with heat transfer simulation models to address the RF wood drying process. Findings on Debye resonances both with the food samples of interest, and on stochastic models representing the heterogeneous spatial distribution of constituents within a food volume, can then be incorporated. Also, apart from Debye resonances, other properties, including both ohmic and dielectric properties other than Debye resonances, can be modelled for study. Thus, the initial model work leverages off of models already developed by HeatWave and their collaborators.

Example 3

Thermal and non-thermal effects of radio-frequency pasteurization on microbiological lethality, color, and texture in representative comminuted muscle foods are examined.

Sample Preparation

Two types of comminuted muscle samples are investigated: beef frankfurter and surimi seafood. Since all food ingredients mixed into samples contribute to every aspect of quality, to include microbiology, sensory, and physical properties, a commercial formulation for both samples is developed. For surimi seafood, the formulation is adjusted to maintain 75% moisture and 1.65% salt. Overall chopping procedures are based on the teachings in Yongsawatdigul, J., Park, J. W., Kolbe, E., AbuDagga, Y. and Morrissey, M. T. 1995, Ohmic heating maximizes gel functionality of Pacific whiting surimi. J. Food Sci. 60:10–14.

Surimi paste is stuffed into stainless steel tubes (1.9 cm I.D.×17.5 cm long). Initial heating is conducted in a 90° C. water bath until internal temperature reaches 70° C. At this temperature, fish myosin and actin complete denaturation and gelation (Oakenfull, D. G. 1996. Gelation mechanisms. Foods and Food Ingredients J. Japan. 167:48–68). Initial cooking for beef franks is suggested at 155° F. (68.2° C.) for 30 min (Hanson, R. 1995. Design and function of batch meat processing ovens. A textbook of Viskase and AMSA Meat Science School. August 16–18. Chicago, Ill.). Therefore, it is assumed that this process mimics initial cooking in the commercial processing of surimi seafood and beef franks.

Cooked gels, without chilling, are removed from the tubes and vacuum-packaged in plastic bags for various thermal treatments for pasteurization.

Pasteurization/Heating Method

Pasteurization is conducted in a radio frequency (RF) heating device.

Heating at the same rates under a range of frequencies enables measurement of the nonthermal effects of RF on aerobic plate counts (APC). As a control, a sample is heated in a water bath (90° C.) for 60 min. Each heat treatment is repeated three times. Changes of internal temperatures as a function of time are monitored using a 21× data logger (Campbell Scientific, Logan, Utah) in the water bath heater, and by fiber-optic sensors in the RF heating device.

Microbiological Assay

Raw paste, initial cooked gels, and pasteurized gels are aseptically collected for aerobic plate count (APC). The microbial assay are conducted by spread-plating on tryptone-peptone-yeast extract (TPE) agar and incubated at 30° C. for 48 hr (Lee, J. S. and Howard, L. A. 1970. Comparison of two procedures for enumeration of microorganisms from frozen foods. J. Milk and Food Technol. 33:237–239).

Textural Properties

Longer time and higher temperature cooking generally causes textural destruction especially in surimi seafood products made with reduced surimi content and higher starch content. Changes of textural properties are monitored as shear stress and shear strain using a torsion test (NFI. 1991. *A Manual of Standard Methods for Measuring and Specifying the Properties of Surimi*, T. C. Lanier, K. Hart, and R. E. Martin (Ed.), National Fisheries Institute, Washington, D.C.). Shear stress denotes gel strength, while shear strain indicates the cohesive nature of gels.

Color Properties

Longer time and higher temperature cooking causes discoloration in surimi seafood (development of yellow hue), especially when some protein additives and sugar are present. Color properties (L*, a*, b*) of gels are measured using a Minolta chroma meter (Minolta USA, Ramsey, N.J.).

Non-Thermal Killing Effects by Radio Frequency

Microbial (APC) destruction is measured in samples heated in a water bath, and in a radio frequency heater for which heating rates are adjusted similar to those measured in the water bath. Various frequencies are used in the radio frequency heater. The difference between the two microbial destruction measurements is used as non-thermal kills.

Model Study

A pasteurization method for the maximum thermal treatment is selected for the model study. *Enterococcus faecium* is selected as the target organism because of its high thermal resistance in sous vide products (Ghazala, S. Coxworthy, D., and Alkanani, T. 1995. Thermal kinetics of *Streptococcus faecium* in nutrient broth sous vide products under pasteurization conditions. J. Food Processing and Preservation 19:243–257; Magnus, C. A., McCurdy, A. R., and Ingledew, W. M. 1988. Further studies on the thermal resistance of *Streptococcus faecium* and *Streptococcus faecalis* in pasteurized ham. Can. Inst. Food Sci. Technol. J. 21:209–212). The stock culture for *Enteroccocus faecium* is revived in cooked meat broth for 24 hr at 37° C., plated on Difco trypticase soy agar (TSA) and incubated for 24 hr at 37° C. These plates are maintained at 1° C. An overnight culture is prepared in a cooked meat broth (pH 7.23, 0.5% NaCl) and incubated at 37° C. for 20 hr so that the cell concentration is 107–108 CFU/ml. Surimi and frankfurter paste are inoculated with the culture and homogenized before the heat treatment. Enumeration follows dilution and plating as described by (Ghazala et al., 1995).

Thermal inactivation trials are performed at each temperature (30, 45, 60, 75, 90° C.) in triplicate. The D-value of *E. faecium* at each trial temperature is determined from a plot of the logarithm of microbial survivors versus heating time. The z-value is obtained by plotting the logarithm of D-values versus heating temperatures (thermal death time, TDT plot). Quattro Pro software is used to determine slope, intercept, and $r^2$ values using least square linear regression analysis.

Pasteurization values represent the minimum number of minutes, at a specific temperature, which are required for the product's coldest point to receive about 13–14 times the decimal reduction of a target organism (Ghazala, S. and Aucoin, E. J. 1996, Optimization of pasteurization processes for a sous vide product in rectangular thin profile forms. J. Food Quality 19:203–215). Pasteurization values are determined by Ball's equation (Ball, C. O. and Olson, F. C. W. 1957, In *Sterilization in Food Technology*, pp. 291, 353, 356, McGraw-Hill Book Co., New York, N.Y.), while cooking values are determined by Mansfield equation (Mansfield, T. 1962, High-temperature short-time sterilization, Proc. 1st Int. Cong. Food Sci. & Tech. Vol 4, Gordon and Breach, London, UK) as follows:

$$\text{Pasteurization value} = P_v = \int_0^t 10^{\frac{(T-T_{ref})}{z}} dt \quad (16)$$

$$\text{Cook Value} = C_v = \int_0^t 10^{\frac{(T-T_{ref})}{z_e}} dt \quad (17)$$

where
 $P_v$=Integrated pasteurization value at the point of slowest heating
 $C_v$=Integrated cooking value at the point of slowest heating
 t=Processing time, min
 T=Temperature at time t, ° C.
 $T_{ref}$=Reference temperature (85° C.)
 z=Slope of the logarithm of the decimal reduction time versus temperature for a specified organism, ° C.
 $z_c$=z-value for degradation of quality of a specified quality factor, e.g., texture and color.

The pasteurization value and cook value are determined using Eq. (16) and (17) employing z-value for *Enterococcus faecium* and a reference pasteurization temperature. Thermal kinetics of *Enterococcus faecium* are calculated.

Example 4

High energy density capacitive heating experiments can be conducted on various packaged comminuted muscle foods, validating the computer simulation model, testing pasteurization efficacy, testing the effects of electromagnetic energy on food quality, and verifying suitable packaging materials. For example, such testing can be performed in a capacitive heating test facility.

The processed food samples can be analyzed for textural changes and pasteurization efficacy. The packaging materials are analyzed for sensitivity to RF energy. The heating vs. time results are analyzed to validate the computer simulation model and to make any necessary adjustments to the model, based on those results. Exact quantities of samples and replication numbers, as well as exact RF power levels and other Example 4 experimental details are determined based on the results of Examples 1–3.

The various media under test are heated at frequencies in the range 1 MHz–100 MHz based on the information gained in Example 1. There are two test scenarios as shown below. The first is a general test over a semi-logarithmic distribution of frequencies. The second concentrates on Debye resonances that may have been identified from Example 1. Other tests experiment, for example, with results of controlled/constant field strength; voltage gradient can vary with tested sample thickness. In all cases, the food package dimensions can be varied—from single, relatively thin package to a stack representing a load up to 24 cm in thickness. Electrode dimensions and shape can be modified in the heating system. For all cases, thermal sensors are placed in the media under test to determine temperature rise and distribution.

Test 1: General Purpose Frequency Sweep:

| Frequencies* | Test Power Levels (Max. Output) | Inoculated (Y/N) | Number of Replications* | Food Type |
|---|---|---|---|---|
| 1–100 MHz | 200 W, 2 KW | Y | 4 | Surimi Seafood |
| 1–100 MHz | 200 W, 2 KW | Y | 4 | Frankfurters |
| 1–100 MHz | 200 W, 2 KW | N | 4 | Surimi Seafood |
| 1–100 MHz | 200 W, 2 KW | N | 4 | Frankfurters |
| 1–100 MHz | 200 W, 2 KW | N | 4 | Packaging only |

*Samples are prepared and tested for each of the following frequencies in the general sweep test: 1, 2, 3, 5, 7, 10, 20, 30, 50, 70, 100 MHz Test 2: Debye Resonance Search In this test, the frequency of the capacitive heater can be set at the location of any Debye resonances that were identified by the results in Example 1. The power level is set first to a low level (100 W) for the first set of samples and the frequency swept gradually to both search for the resonance and to test for its dependence on temperature. Once Debye resonances are located at 100 W, the system is adjusted to 2 kW and the Debye resonance experiment repeated on a different set of replicated samples with the temperature rise measured.

Example 5

In Example 5, testing was conducted to determine the heating efficiency of capacitive dielectric (RF) methods and systems. The testing conducted in Example 5 was derived from the planned testing of Example 4. Rather than considering Debye resonance frequencies alone, the testing of Example 5 was focused on controlling the heating process based on impedance matching.

First Tests

In the first series of tests, a capacitive dielectric (RF) heating system with a variable frequency range of 12–132 MHz and up to 1 kW output power was used to heat and pasteurize surimi, frankfurters, alfalfa seeds and packaging. Samples were tested to evaluate the effects of RF frequency and electric field intensity on heating rates.

Figure 16:
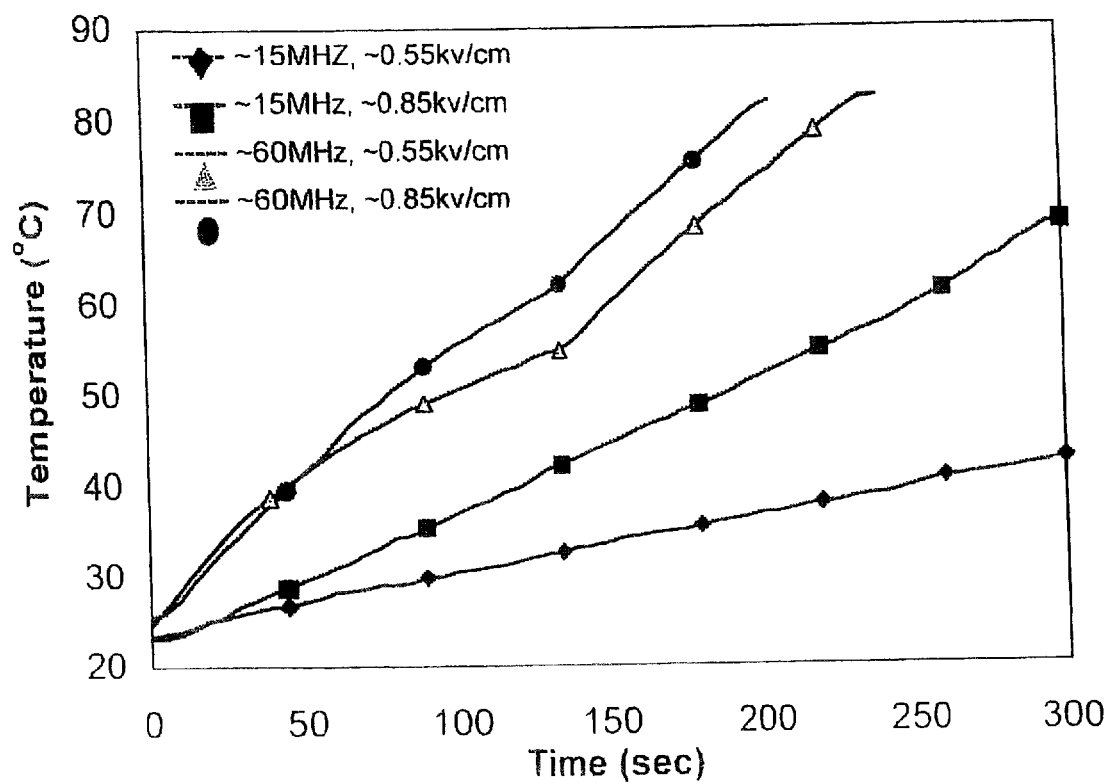
FIG. 16 is a temperature vs. time profile showing results of a capacitive dielectric (RF) heating process described in Example 5.

Following adjustments in the system, including repositioning electrodes to reduce the air gap and rounding sharp edges of surimi gels, results showed that relatively uniform and fast heating were achieved with both seeds and surimi. In addition, increased heating rates at higher frequencies and higher electric field intensities were observed for seeds. FIG. 16 shows much faster heating rates at 60 MHz than at 15 MHz for a given field intensity for seeds.

Second Tests

The purpose of the second tests was to examine if faster heating rates could be achieved with possible adjustments of air gap, sizes and shapes of electrodes and configurations of seeds and packaging. A 1 kW capacitive dielectric heating system with a variable frequency of up to 50 MHz was used in the second tests. The operating frequency used was between 33 to 39 MHz.

The impedance match between the load impedance and the signal generating circuitry was manually controlled by manually setting the frequency (i.e., tuning four knobs on a frequency generator). The forward and reverse power levels were measured manually, and the voltage through the medium was also measured.

Figure 20:
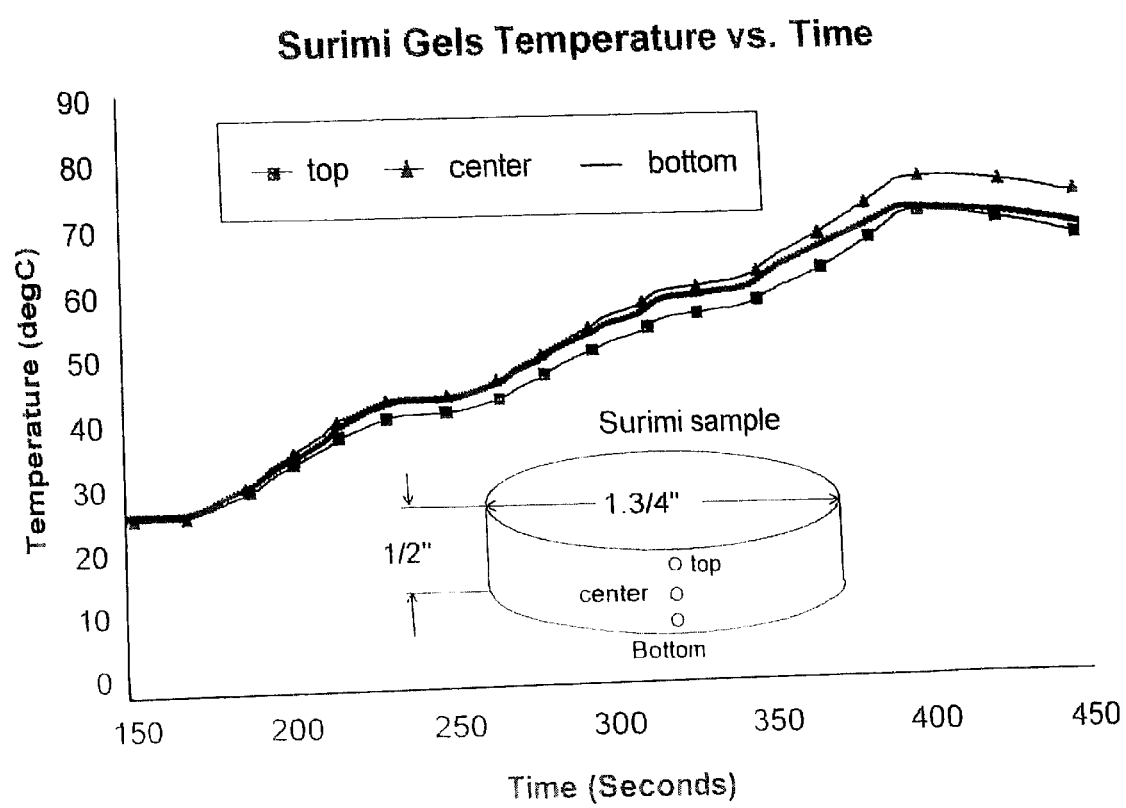
FIG. 20 is a temperature vs. time plot for surimi gels as described in Example 7.

FIG. 20 shows temperature vs. time profiles when a disk-shaped surimi sample was heated from about 26 to 77° C. Three temperature probes measured variation across the thickness of the surimi sample. The largest measured temperature difference was less than 5.6° C. (between the center and top positions). This result indicates that better temperature uniformity could be achieved using capacitive dielectric heating, than by using conventional hot water bath heating. AbuDagga and Kolbe (2000) show that hot water heating produced an initial temperature difference of 20–30° C. between the surface and the center of a surimi sample. *Analysis of Heat Transfer in Surimi Paste Heated by Conventional and Atomic Means*, Journal of Aquatic Food Product Technology, 9 (2):43–54

FIG. 20 also shows that the heating rate appeared to slow down and almost stopped twice during the heating process. This break in the heating rate was caused by impedance mismatch between the power amplifier and the load. Manual adjustment of frequency could not be preformed quickly and accurately enough to keep pace with the changing dielectric or ohmic properties of this surimi as it was heated. This led to the loss of impedance match between the power amplifier and the heated surimi as its dielectric and ohmic properties or electrical impedance changed with temperature.

Figure 21:
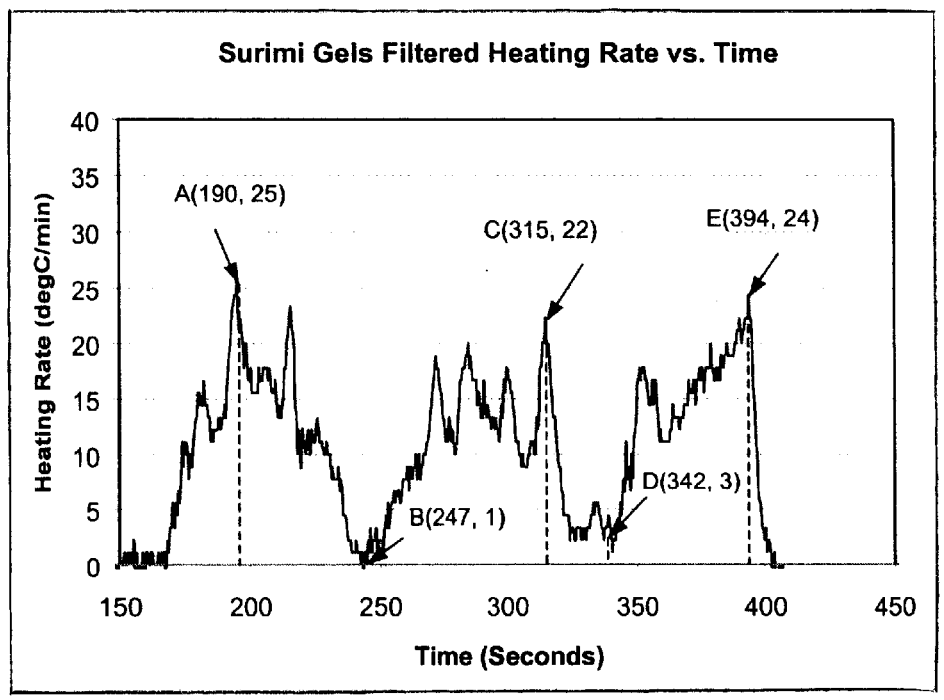
FIG. 21 is a heating rate vs. time plot for surimi gels as described in Example 7.

FIG. 21 is a plot of the first derivative of the temperature-time profiles of FIG. 20. As shown, the heating rate first increases to 25° C./min at point A then falls to almost zero at points B and D due to loss of impedance match. The heating regained its maximum rates at points C and E.

Figure 22:
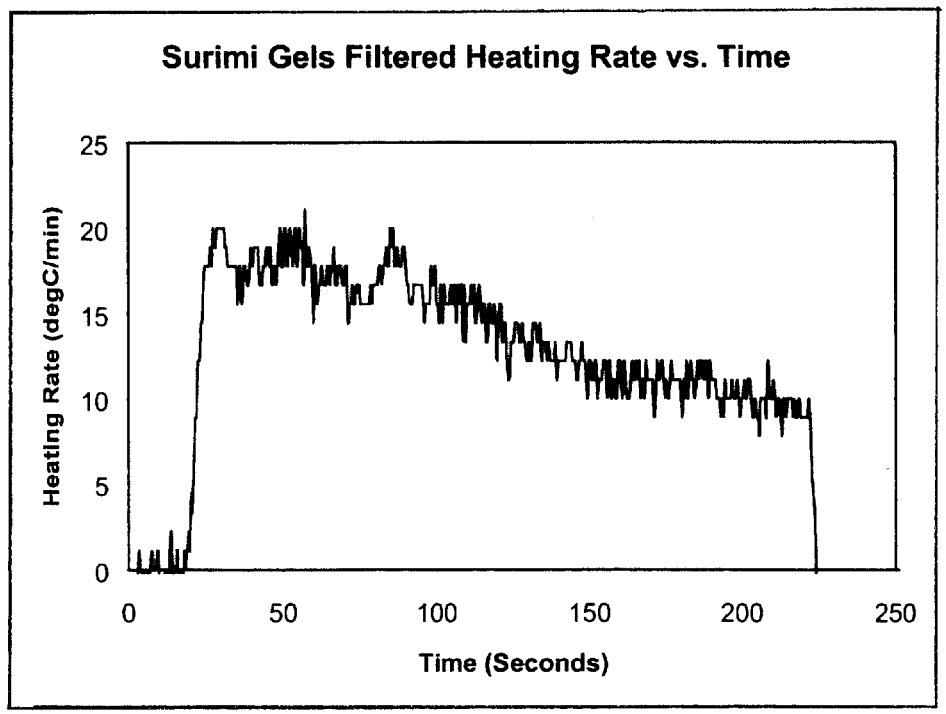
FIG. 22 is a plot of heating rate vs. time for surimi gels similar to FIG. 21 but showing improved uniformity in heating rates due to better impedance match.

FIG. 22 shows heating rate vs. time for the surimi sample when a relatively good impedance match was maintained by manual adjustment. The resulting heating rates in FIG. 22 were much more uniform than those shown in FIG. 21.

As a result, automatically controlling the frequency of the frequency generator as well as the elements in an impedance matching network, to maintain impedance match will produce better results. Such an automated system helps achieve maximum neating rates for the power available and the through put of the food being tested.

Additional results specific to the seed testing are discussed in Example 6.

Example 6

Example 6 concerns the use of capacitive (RF) dielectric heating for the sterilization and/or pasteurization of seeds packaged in edible films or alternatively standard polymer films.

Considerations in Capacitive (RF) Dielectric Heating of Seeds

Capacitive (RF) dielectric heating may also be useful to improve or enhance the germination rates of seeds through the pretreatment of seeds prior to planting and sprouting with capacitive (RF) dielectric heating. The warming of seed shells as well as the control or reduction/elimination of gernination-inhibiting microorganisms are the two primary methods of improving germination rates when using capacitive (RF) heating technology as a pre-germination seed treatment process.

Edible film packaging materials will be chosen so as to allow for the complete isolation of seeds from external contaminating agents after being sterilized in the capacitive (RF) dielectric heating system. The films will be biodegradable and water soluble so as to naturally dissolve when planted to produce sprouts in either a sterile bed or hydroponic environment.

The capacitive (RF) dielectric heating system will be capable of use in heating applications to enhance seed germination effects. The system will heat for the purpose of killing germination-inhibiting organisms as well as softening the hard encasing material of seeds to prepare for germination. The seeds will be either packaged in edible or non-edible packaging films (individually or collectively), or sealed containers, or alternatively heated in non-sealed containers.

The capacitive (RF) dielectric heating system will be capable of use in heating applications to enhance growth and flowering performance and yield performance and disease and pest resistance along with other delayed enhancement effects of plants grown from seeds treated by the capacitive heating. The system will be capable of again targeting optimum frequencies (in this case not necessarily limited to Debye resonances), that have been proven to be successful in seed treatment processes to achieve the desired delayed effects that occur during the plant's growth stages.

The capacitive (RF) dielectric heating system will be designed such that there are no germination-inhibiting effects from the sterilization or pasteurization processes for seeds. This will result from understanding the dielectric properties of seeds and heating at the optimum frequencies for enhancing microbial kill and germination and staying away from frequencies or exposure times that may inhibit seed germination.

The capacitive (RF) dielectric heating system will allow for various product geometries to handle the wide variation of packaged or unpackaged seed geometry variations.

The various seed sprout products may have optimum "Debye resonances" or frequencies where capacitive (RF) dielectric heating will be the most efficient. As described in the First Approach section above, the capacitive (RF) dielectric heating system can be set to target those optimum frequencies. These possible "Debye resonances" in seed sprout products will have particular temperature dependencies. The capacitive (RF) dielectric heating system will be designed to track those temperature dependencies during heating as the temperature rises. The various seed sprout products may have other "optimum" frequencies that are not necessarily "Debye" resonances but are still proven to be important frequencies for achieving various desired benefits in either the seeds or plants growing from the seeds. The capacitive (RF) dielectric heating system will be capable of targeting those frequencies and tracking any of their temperature dependencies.

Target micro-organisms or agents also may have "Debye" resonances or other non Debye optimum frequencies that are proven to be especially effective in achieving selective killing performance of the organisms without adversely affecting the seeds that the organisms reside on any packaging materials that may be used. The capacitive (RF) dielectric heating system will be capable of targeting those optimum frequencies and tracking them with temperature to achieve selective control of those organisms. In general various microscopic pathogens (microbial organisms, fungal spores, etc.) as well as macroscopic pests (e.g., insects, insect larvae, etc.) may have "Debye" resonances or other non Debye optimum frequencies that are proven to be especially effective in achieving selective killing performance of the organisms to allow for the broad use or application of the above-described capacitive (RF) dielectric heating technologies. The capacitive (RF) dielectric heating system will be designed to accommodate these optimum frequencies and track them with temperature in a broad arrangement of commercial, industrial, laboratory and field implementations of the technology for use in the food, agriculture and medical industries.

Under normal circumstances the seeds will be packaged in edible and/or non-edible standard films which are invisible to the applied RF electric fields to insure that the packaging materials will not heat or bum or change any of their packaging performance qualities after exposure to the RF field. The packaging materials and corresponding capacitive (RF) dielectric heating system will be designed (including frequency selection) for such performance and compatibility.

Under special circumstances the seeds may be packaged in certain types of edible films that exhibit Debye resonances allowing for the heating of the packaging film and seeds simultaneously with a complex multi-frequency profile from the capacitive (RF) dielectric heating system. This would allow for supplementary heating of the seeds from the packaging material over and above the direct dielectric heating of the seeds themselves. The location of the Debye resonances in the films may be at much lower frequencies than those found in the seeds. The capacitive (RF) dielectric heating system will be designed to target the Debye resonances of both the edible film packaging materials and seed products either simultaneously or in a time-multiplexed manner that approximates simultaneous heating behavior. The frequency and heating profile would be designed to allow for the heating of the packaging materials and supplementary transfer of heat to the seeds without the destruction of the packaging materials.

Alternatively, the edible films and seeds may have similar dielectric properties, such as similar Debye resonances and/or dielectric loss factors, allowing for more uniform heating.

Testing and Results

In Example 6, capacitive (RF) dielectric heating apparatus was used to pasteurize packaged alfalfa and radish seeds that are used to produce vegetable sprouts. Seed samples were subjected to RF heating at controlled RF frequency and electric field intensity. The time and temperature profiles of the seeds were monitored during each test to determine the product heating rates. Seeds germination rate, total aerobic plate counts, coliforms, and E. coli was also determined.

It was found that the rapid and uniform heating in vegetable sprout seeds could be achieved by using RF energy. The heating rate and uniformity strongly related to RF frequency, electric field intensity, and RF system (i.e., electrode design and frequency control) and sample configurations. Controlling final seed temperature as related to seed moisture content and rapidly cooling seeds after RF heating will help avoid moisture loss and improve results.

Vegetable sprout seed treatments using RF energy were conducted in two rounds of tests.

The first tests were to study the effects of RF frequency and electric field intensity on the heating rate of seeds, as well as their impacts on seed germination and occurrence of microorganisms. A RF system with a variable frequency range of 12 to 132 MHz and 1 kW output power was used for heating alfalfa and radish seeds.

A 2×2 Randomly Block Design (RBD) experiment using frequency as a block with three replications was used. Frequencies (f) of approximately 15 and 60 MHz (±10% variation) and electric field intensities (E) of approximately 0.55 and 0.85 kV/cm (±20% variation) were applied for heating alfalfa and radish seeds with targeted final seeds temperature of about 75° C.

The purpose of the second tests was to examine if faster heating rates could be achieved with possible adjustments of air gap, sizes and shapes of electrodes and configurations of seeds and packaging.

A 1 kW capacitive dielectric heating system with a variable frequency of up to 50 MHz was used in the second tests. The operating frequency used was between 31.2 to 3 MHz.

During RF heating in both tests, the system frequency was adjusted manually on a frequency generator to achieve optimal impedance match between the heated seeds and signal generating circuitry. Impedance match was controlled by changing frequency, as well as adjusting an impedance matching network connected to the load, i.e., to the cavity/capacitive electrode system. The capacitive electrodes were adjusted and optimized to reduce the air gaps and therefore reduce the maximum required overall electric field intensity across the electrodes so as to reduce the risk of arcing as well as the effects of fringing fields. The electrodes were also adjusted and optimized to conform to the smaller sample geometry to increase the electric field intensity actually across the sample, which allowed for the higher power densities and faster heating rates. A minimum of four replications for each combination was tested.

Comparing Examples 5 and 6 shows how quickly samples may be heated if impedance match is maintained. Seeds could be heated in 25 s when impedance match was maintained, whereas surimi required a 3 min heating time when impedance match was not maintained as closely.

Sample Preparation

Radish seeds for the testing were provided by Dorsing Seeds (Nyssa, Oreg.). The radish seeds were produced in 1999 and had a moisture content of about 6.5% and an estimated germination rate of ~97%. Alfalfa seeds for the testing were purchased from Andrews Seeds (Ontario, Oreg.). The alfalfa seeds were produced in 1998 and had a moisture content of about 7.3% and a germination rate of ~92%.

Figure 15A:
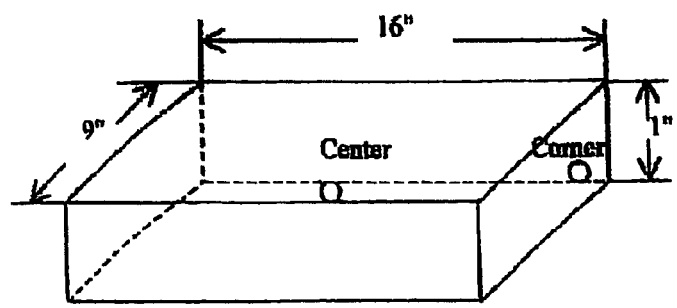
FIGS. 15A and 15B are schematic diagrams showing the container configuration and relative electrode position for the first and second tests, respectively, of Example 6.

In the first tests, alfalfa and radish seeds were packaged in 9"×6"×1.5" polystyrene seeds trays. Approximately 1600 g alfalfa seeds or 1400 g radish seeds were enclosed in the seed tray. The same amount of each type of seeds was also packaged inside water-soluble edible film bags (Polymer Inc., West Heaven, Conn.). For the second tests, one half of a polystyrene box (4½"×4½"×1") with polycarbonate spacers filled in the other half was used for holding the seeds FIGS. 15A and 15B. The sample sizes used in this experiment were determined based on the knowledge learned from the previous tests with a goal for achieving rapid and uniform heating.

In the first tests, seeds were kept inside the RF unit for a few minutes and then poured into a large plastic container and stirred for rapid cooling after being subjected to RF heating. A 250 g sample of seeds from each treatment were randomly selected and packed in aseptic bags, and then send back to the laboratory for moisture content, seeds germination, and microbial tests. Sanitation and personal hygiene procedures were followed to avoid further contamination of seeds. Untreated seeds were used as controls.

In the second tests, seed samples were kept in the cavity for one to several minutes before they were poured into a plastic zipper bag. No consideration was given to cool them quickly after heating. Moisture content and germination rate were measured on RF heated and unheated seed samples.

Time-Temperature Profile Monitoring

During the first tests, Luxtron probes were set up to display the temperature of seeds every 5 s, and a laptop based datalogging system was used to acquire each time-temperature reading. In this case, the 5 s sample interval rate was sufficient due to the relatively slow heating rates.

Figure 15B:
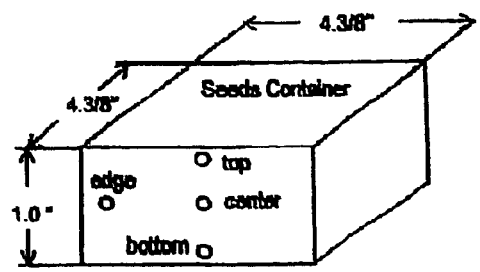

During the second tests, four fiber-optic temperature probes (FOT-C low temperature sensor, produced by FISO Technology Inc., of Quebec, Canada) were used for recording the time-temperature profiles in the seed containers every 1.2 s. The temperature probes have a tip of about 1.0 in (25.4 mm) long and 0.059 in (1.5 mm) diameter. The accuracy is 0.3° C. in the temperature range of −50 to 250° C. They were precisely located in the center, upper layer, lower layer, and corner of the box by the spacers and the mounting holes in the spacers. All probes were inserted 1 inch into the container (FIG. 15B).

Seeds Germination Tests

Seeds germination rates were measured at the Oregon State University Seeds Laboratory. The method used to germinate the alfalfa and radish seeds followed standards described in the Association of Official Seed Analyst Rules For Testing Seed. Four hundred seeds were planted for each sample in 100 seed replications. The seeds were planted on brown towels moistened with water. The samples were placed in a 20° C. germinator, and then evaluated after 7 days germination using the Association of Official Seed Analysts Seedling Evaluation Handbook.

Microbial Tests

Total aerobic plate account (APC), coliforms, and E. coli of controlled (unheated) or RF heated seeds were analyzed at the Laboratory Services Division, Oregon Department of Agriculture. Twenty-five grams of dry seeds were placed in a sterile blender jar, and 225 ml of Lactose Broth (diluent) was added to achieve a 1:10 dilution. Seeds and diluent was blended on high speed for 2 min, and further decimal dilutions were prepared.

Seeds were plated in the tryptic soy agar (TSA) for total aerobic plate count (APC) measurement. The plates were incubated at 32° C. for 24 h. A spiral plate method was used to determine APC in seeds as described by Maturin and Peeler, Bacteriological Analytical Manual, 1998 ($8^{th}$ Ed., Rev. A), FDA (published by AOAC International).

The ColiComplete disc method (Biocontrol System, Inc., Bellevue, Wash.) was used for the analysis of coliforms and *E. coli*. Lauryl sulfate tryptose broth (LST) tubes were inoculated with appropriate sample dilution series selected to determine MPN levels or presence/absence of total coliforms and *E. coli* in seeds. One ColiComplete disc was aseptically added to each tube. Tubes were then incubated at 35° C. (AOAC Official method 992.30, 1992). For total coliforms reading, each tube was examined for visually detectable blue color on disc or in surrounding medium after 24 h incubation. Presence of blue color indicated confirmed positive result for total coliforms. Tubes were reincubated at 35° C. for additional 24±2 h and reexamined. Continued absence of blue indicated negative result; presence of blue indicated confirmed positive result for total coliforms. The MPN code or presence/absence of total coliforms in the sample were read and recorded. For *E. coli* reading, tubes were examined under longwave UV light (366 nm) after 30±2 h initial incubation. Fluorescence indicated confirmed positive result for *E. coli*. The MPN code or presence/absence of *E. coli* in the seeds were read and recorded.

The results from the microbial tests are reported in FIG. 14.

Time-Temperature Profiles of Seeds Subjected to RF Heating

Figure 17:
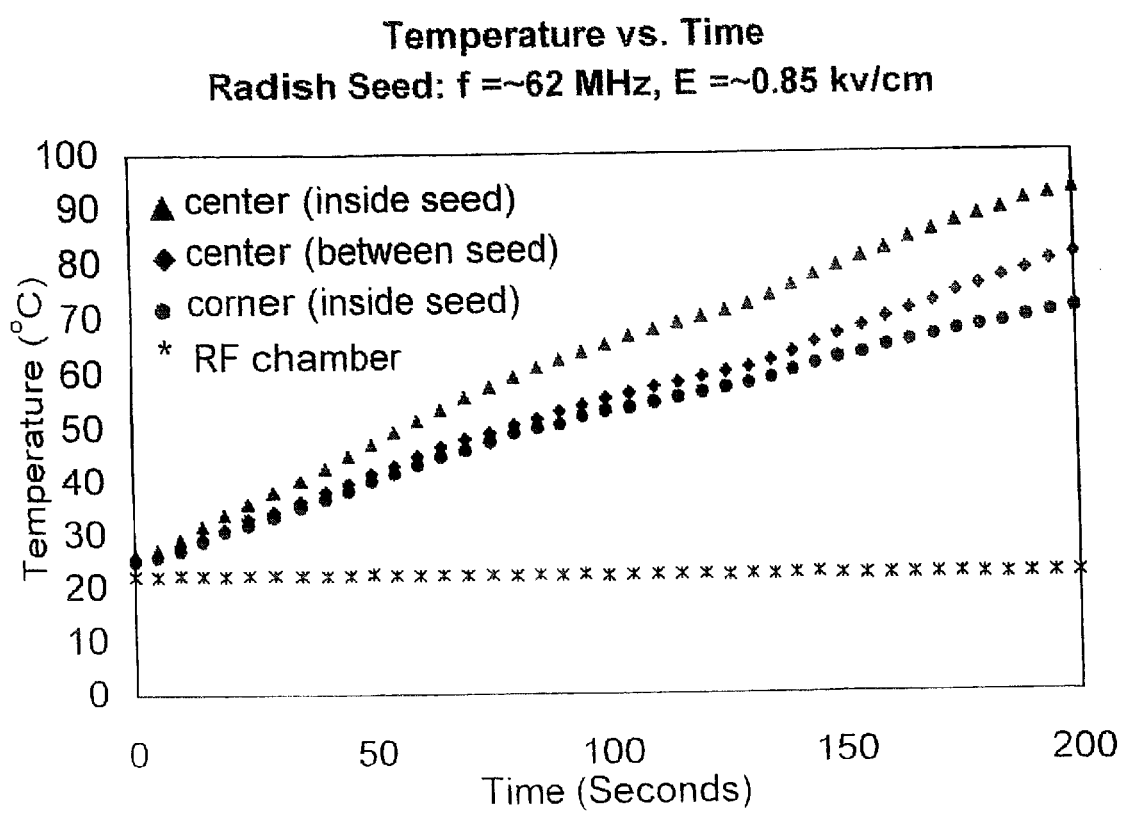
FIG. 17 is a plot of temperature vs. time showing heating uniformity for radish seeds in the first tests of Example 6.

Regarding the first tests, relative fast and uniform heating was achieved for both types of seeds (FIGS. 12 and 17). Heating rates increased with increased frequencies and electric field intensities as indicated by the greater slopes of temperature-time profiles obtained at 60 MHz and 0.85 kV/cm at a given field intensity and frequency, respectively. However, the heating rates achieved from this experiment were still lower than those suggested for optimal germination of seeds because of lower electric field intensity caused by limited RF power supply, larger physical sample size, as well as the electrode geometries and larger air gap sizes. Previous studies recommended to heat seeds from ambient temperature to ~75° C. in 10 to 20 second in order not to kill seeds for germination. (Nelson, S. O., Stetson, L. E. and Works, D. W., Hard-seed reduction in alfalfa by infrared and radio-frequency treatment, Transactions of ASAE, 11(5): 728–730, 1968). Thus, the second tests were targeted for faster heating.

By adjusting sample sizes, air gap, and configurations of seeds and packaging, much faster heating was achieved during the second tests (compare FIGS. 12 and 13). As shown in FIG. 13, heating rates ranged from 56 to 109° C./min in the second tests, as compared to 4.66 to 20° C./min for the second tests.

Figure 18:
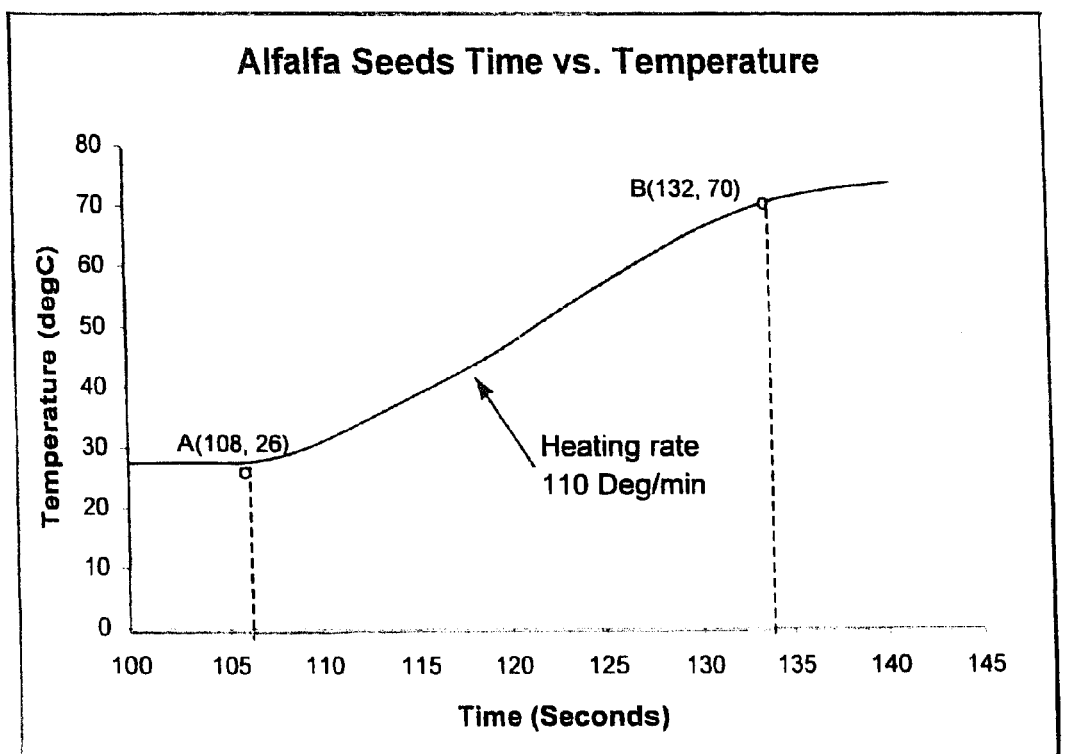
FIG. 18 is a plot of temperature vs. time showing the heating rate for alfalfa seeds in the second tests of Example 6.
Figure 19:
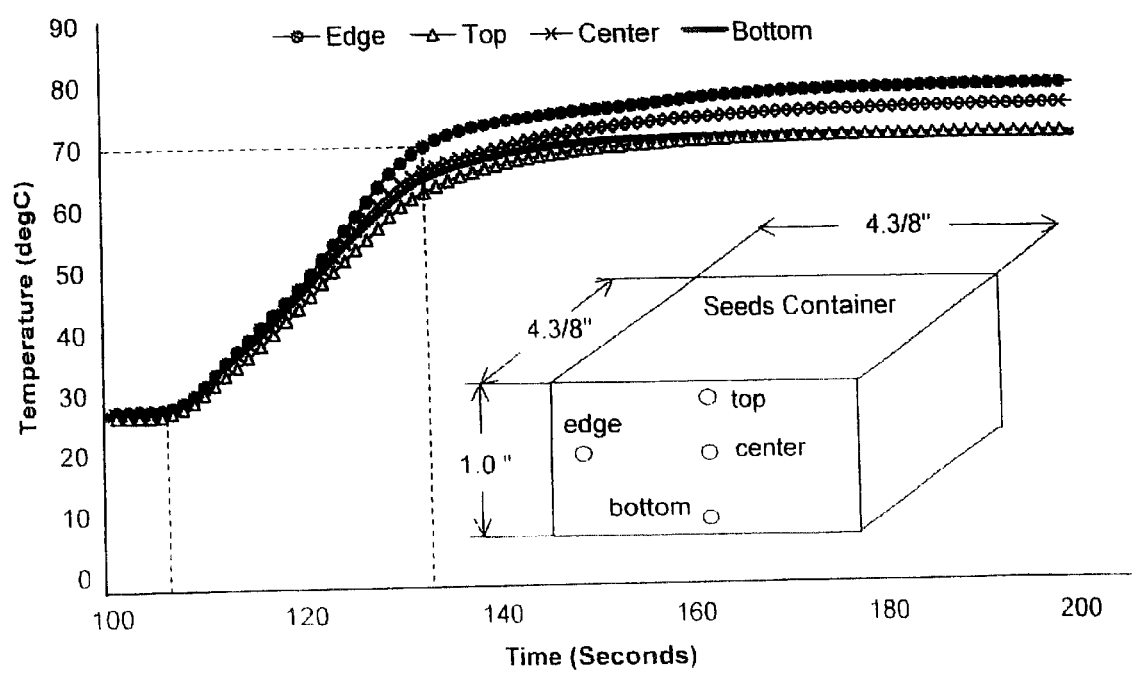
FIG. 19 is a plot of temperature vs. time showing the temperature distribution for alfalfa seeds in the second tests of Example 6 relative to their position within the container.

FIGS. 18 and 19 show temperature—time responses for alfalfa seeds exposed to RF field at the frequency range of 31.3 to 34.4 MHz. As shown in FIG. 18, the maximum heating rate for the seeds was estimated to be 110° C./min between points A (108 sec, 26° C.) and B (132 sec, 70° C.), which compares favorably with the 109° C./min rate shown in FIG. 13, considering measurement accuracy.

In addition to fast heating rates, high heating uniformity was also achieved. FIG. 19 shows profiles of temperature vs. time using data from a typical test with alfalfa seeds. All probes were inserted 1 inch into the container. During the heating period (between the two dashed vertical lines), the measured temperatures at the top, center, and bottom positions showed differences of less than 2.5° C. between the center and top position, and less than 1° C. between the center and bottom position. The largest temperature difference was less than 6.5° C. at the end of heating between the edge and top positions.

Seed Germination

The duration, final temperature and holding time at the final temperature (i.e., how fast the seeds were cooled) influenced how much moisture the seeds lost during the heating process. A lower final moisture content in the seeds is directly related to a lower germination rate for the seeds.

The seed germination rates as related to RF frequency, electric field intensity and final product temperature are shown for the first tests in FIG. 12. In general, without the ability to control impedance match, the seeds could not be heated as rapidly as possible, so too much moisture was lost, which decreased the seed germination rate. Also, without the ability to measure the seeds' final temperature accurately, the final temperature may have risen too high, which undesirably increased the moisture loss. In some cases, lack of temperature uniformity throughout all of the sample(s) being heated could lead to some samples being heated above a desired final temperature and/or beyond an optimum duration, which would also undesirably increase the moisture loss.

The interactions between frequency and electric field intensity on seed germination were found. At the lower field intensity of 0.55 kV/cm, seed germination rate was similar at both frequencies, however, the higher frequency of 62 MHz produced seeds having a higher germination rate than those treated at the lower frequency of 15 MHz. This may be caused by the rapid heating rate at high frequency.

The influence of final seed temperature on seed germination was not consistent from this experiment although previous study indicated that the final seed temperature is critical to the seed germination rate (Nelson, 1968, 1976). Again, many other factors such as frequency and electric field intensity were involved.

Thus, in the second tests, frequency was controlled to help maintain impedance match. Specifically, the frequency was controlled within the range of 31.2 to 31.6 MHz. Similarly, electric field intensity was also controlled to be the same for all runs.

The results from the second tests are reported in FIG. 13. Heating rates were significantly improved in the second tests due to electrode optimizations, reduction in air gaps (to maximize the electric field intensity across the actual sample), reduction in sample size (and therefore thermal mass), and finally, better control of impedance match. As stated, frequency and electric field intensity were controlled for all the tests.

It was confirmed that the final temperature of seeds is certainly a factor affecting germination rates. However, the longer holding and cooling times after heating finished were also a contributing factor to poor germination rates. Higher final temperatures plus long temperature ramp-down times all contributed to drying or moisture loss. Thus, cooling the seeds quickly after heating is advantageous.

When final temperature exceeded 75° C., it caused a reduction in seed germination rate as shown in FIG. 13 for the samples coded as RD-G4-01 (germination rate 32%), AF-G4-03 (germination rate 27%), and AF-G4-04 (germination rate 13%). This is consistent with previous findings that "the most important temperature is the final seed temperature raised by RF energy. For seeds in the normal moisture content of 6 to 7%, 75° C. is close to the optimum for increasing seeds germination" (Nelson, 1968, 1976). When final temperature is too high, seeds were actually killed.

Nelson also reported that the final temperature produced by optimum RF treatment levels influenced final moisture content of seeds. Final moisture content decreased as final temperature increased. In Nelson's findings, final moisture content ranged from 9.8% at a final temperature of 49° C. to a final moisture content of 2.8% at 100° C. Thus, it is important to control final seed temperature according to the moisture content of seeds. This shows the critical nature of having accurate temperature measurement capability, including accurate temperature sensors.

Although relatively fast heating rates were achieved in the second round of tests, germination rates on the seed samples are still much lower than expected. One of the possible reasons could be the seeds were held too long in the cavity after heating, i.e., they were not removed immediately for a quick cooling down.

In both experiments, it was found that seeds lost some of their moisture as evidenced by decreased moisture contents after RF heating. As shown in FIG. 13, the moisture content of radish seeds reduced from its original of 6.27% to about 4.5~5.4% and alfalfa seeds from 7.12% to 5.5~6.7%, depending on the actual heating rate and final seed temperature. This was confirmed by observed moisture condensation on the inside of the top lid of the seed tray as a result of moisture accumulation. Previous studies indicated that moisture content is important for seed tolerance to final heating temperature, in turn affecting germination rate (Nelson, 1968). Generally, seeds of lower moisture content responded more favorably to treatment than high moisture content seeds. This finding indicated the need for rapid cooling of seeds to maintain their original moisture contents in order to achieve desired seeds germination rates. Also this finding shows the need to accurately determine the final temperature and allow the system to reach this temperature with precision.

Microbial Results

Total aerobic plate count (APC), coliforms and *E. coli* were measured in the first round of experiment, and the results are summarized in FIG. 14. No significant differences were observed on APC numbers on radish seeds between RF treated and control samples. However, RF heating resulted in one log reduction of APC on alfalfa seeds, i.e., reduced from $10^5$ to $10^4$. Frequency did not affect, but higher electric field intensity of 0.85 kv/cm further reduced APC number from $4 \times 10^4$ to $1.3 \times 10^4$ at 15 MHz, and from $5.2 \times 10^4$ to $2.4 \times 10^4$ at 60 MHz, respectively. RF treatment has no significant effects in coliforms on both types of seeds. The number of *E. coli* was less than 3.6 no matter what the type of seeds, frequency or electric field intensity applied.

The microbial tests conducted in this study were not the challenge tests. That is, seeds were not intensively inoculated with any bacteria. As seeds used for this study were relatively clean, it was difficult to see the exact effects of RF heating on microorganisms. According to seed sanitation standards from International Sprout Grower Association, the number of *E. coli* on vegetable sprout must be less than 10/g. Seeds used for the tests did meet this standard. Previous research indicated that the major impacts of RF energy on microorganisms is simply based on heating, i.e., raised temperature kills bacteria. Kozempel, Michael F.; Annous, Bassam A; Whiting, Richard C., Inactivation of Microorganisms with Microwaves at Reduced Temperatures, J. Food Prot., 1998, vol. 61(5), 582. Thus, the challenge tests did not apply in the second round of tests.

As stated above, there is strong potential for using capacitive dielectric heating in pasteurizing packaged seeds. HPMC- or CC-based edible films could be a good choice of packaging films because of their reduced sensitivity to a radio frequency field. The inverse square root relationship of the loss tangent with frequency (at higher temperatures) would point towards the use of high frequencies (>30 MHz) for seeds. This is due to the positive linear dependence of the power density on both the frequency and the loss component of permittivity (loss factor) when dielectric loss mechanisms dominate.

Potential Manufacturing Process Flow Applications

There are several potential manufacturing process flow applications of this technology in the food industry. These are shown in FIG. 8 in schematic form. The four manufacturing process flows shown in FIG. 8 could represent the following types of process applications:

A. Capacitive (RF) dielectric heating of a mixed particulate slurry (e.g., diced vegetables in soup) where the device can be tuned to preferentially or selectively heat the particulate material by targeting its Debye resonances. Conversely, the device may be tuned to preferentially or selectively heat the formulated carrier medium by targeting its Debye resonances instead.

B. Capacitive (RF) dielectric heating of foods within a package (e.g., pasteurization of packaged surimi seafoods) where a medium can be heated even though it has already been packaged within an electrical and thermal insulator.

C. Capacitive (RF) dielectric heating action targeted toward in-situ surrounding micro-environment of packaged products. In such cases, secondary influences motivated by and resulting from RF interaction with in-package atmosphere (e.g., elemental gases, gaseous molecular compounds, aerosols, liquids and/or fluids) result in the generation of quality enhancing, preserving and/or pasteurization effects.

D. Elicitation of live culture with RF energy to stimulate production of cellular biomass, intra- or extra-cellular metabolites, and/or fermentation products.

General Aspects

The capacitive (RF) dielectric heating system will have power control and voltage/electric field level control capabilities as well as potentially contain a gridded electrode arrangement (see FIGS. 6–7) to allow for precise control of the field strength vs. time and position in the heated sample. This will allow for the heating of small and large product geometries as well as composite and non-uniform product configurations to prevent arcing, burning and thermal runaway problems. This may be especially important for thawing applications, and for surimi and packaged seed products that may come in non-regular product geometries.

The capacitive (RF) dielectric heating system will be compatible with all of the existing production flow schemes described for meat and fish products and extend those industrial and production process capabilities where applicable to allow for the treatment of seeds.

The capacitive (RF) dielectric heating system will be designed in such a way as to be compatible with export sterilization and pasteurization processes that insure that quality foods are shipped abroad.

The capacitive (RF) dielectric heating technology will be developed so as to allow for household "counter top" solutions to allow for the home/kitchen broad based sterilization and pasteurization of all types of foods that consumers use. This solution will be a competitive product to microwave ovens but will operate at lower frequencies where electric field penetration is deeper and more uniform.

In addition to the above examples of various manufacturing process flows, there also exists the potential of using this technology in combination with other heating technologies to improve product quality, process productivity, and/or energy efficiency. This technology will allow production floor space to be reduced and throughput to be increased compared to conventional hot water heating systems.

Processes that might benefit from the superposition of RF exposure include liquid-solid and liquid-liquid extraction, miscella and phase separation, pressure and vacuum treatments, aeration, and the like.

By certain processes, it is possible to obtain uniform heating over the entire volume of a food product. This technology heats the polar dielectric molecules evenly and directly over the entire volume of the sample as opposed to hot water and steam heating or cold water thawing technologies that rely on thermal conduction from the surface of the medium. Capacitive (RF) dielectric heating offers more uniformity than higher frequency microwave ovens due to the lower RF frequency range which, for the purpose of this disclosure, is defined as being about 300 KHz to 300 MHz, with best results at about 1 MHz–100 MHz, allowing for deeper penetration into saline media as well as the fact that the media is small compared with a wavelength and so capacitive heating does not rely on the complex wave propagation and reflection modes required in a microwave oven. The field patterns are generally simple 2-D patterns between parallel plates again resulting in more uniformity in heating.

As one example, it is difficult to thaw large packages of foods quickly and uniformly with minimal degradation of the quality of the food, such as in the case of thawing large pieces of frozen meat. Conventional hot water bath thawing processes not only take a long time, but also could alter the quality of the meat. Microwave heating could not be used for large packages because it does not penetrate deeply enough. With capacitive (RF) dielectric heating, however, sufficient penetration is possible, and the automatic impedance matching with a gridded electrode system ensures that heating is fast and uniform. These characteristics of RF heating may be particularly advantageous in the real-time preparation of food, such as by restaurants and others in the food service industry, since RF heating outperforms other known technologies.

Capacitive (RF) dielectric heating of food is a clean process with no generation of wastewater. Capacitive (RF) dielectric heating systems according to the present invention offer numerous advantages over hot water and steam heating (for pasteurization or sterilization) and cold water thawing technologies and other heating technologies.

Capacitive (RF) dielectric heating is less expensive (on a cost per pound of treated food basis) than irradiation or high pressure technologies for heat pasteurization.

Capacitive (RF) dielectric heating will heat a food sample even when packaged in a thermal and electrical insulator as well as if the sample is thick and unusually shaped due to the fact that the internal polar molecules are being heated (therefore, there is no reliance on thermal conduction from the surface). Hot water and steam technologies require flat geometries with very thin packaging or insulating layers.

Capacitive (RF) dielectric heating as described above allow for heating of food within packaging without developing high local power densities, such as the concentration of a small amount of food/water within the seam of a packaging material, which might result in a small thermal mass combined with a large dielectric loss factor being exposed to a potentially large localized voltage gradient.

With the methods and apparatuses described herein, it is possible to avoid the potential disadvantages of capacitive (RF) dielectric heating methods mentioned above. According to the first approach, the potential limitations are addressed by providing frequency control to match Debye resonances or other parameters of the dominant constituents of the medium, track them with temperature, control field strengths and optimize product geometries to prevent arcing. According to the second approach, automatic impedance matching ensures that the effective adjusted load impedance is matched to the output impedance of the signal generating unit, thereby ensuring that the load is heated with maximum energy (thus yielding a shorter heating time).

To prevent or reduce the risk of thermal runaway, a gridded electrode system can be used with an infrared scanner to monitor the entire body of a food product being heated. And, the electrode system may be constructed to lower the field strengths on the packaging seams (and packaging methodologies can be used to keep food out of seams to avoid heating the seams). In response to signals from the scanner, individual components of the food product can be independently heated by adjusting local field strengths or by switching some portions of the grid off in different duty cycles to prevent "hot spots".

It is to be understood that the present invention includes all such modifications as may come within the scope and spirit of the following claims and equivalents thereof.

What is claimed is:

1. A capacitive RF dielectric heating apparatus for treating food products, the apparatus comprising:
    a source of an AC RF signal at an RF frequency not greater than 300 MHz, the source being connected to a pair of electrodes on opposite sides of a product treatment zone to cause an RF signal to generate an AC electric field in the product treatment zone;
    a frequency controller to adjust the frequency of the RF signal between different RF frequencies;
    a mathematical model that predicts impedance of the food products as a function of temperature;
    an impedance sensor to sense an impedance of the food products;
    a computer programmed to receive impedance data from the impedance sensor, to process the impedance data using the model for the product, and to apply a control signal to the frequency controller to adjust the frequency of the RF signal to match the sensed impedance to a predetermined impedance.

2. The apparatus of claim 1 wherein the source of the AC signal includes a frequency generator connected to a power amplifier.

3. The apparatus of claim 2 further comprising an impedance matching network tunable to match the output impedance of the power amplifier to the impedance of a load comprising the pair of electrodes and any product in the product treatment zone between the two electrodes.

4. The apparatus of claim 2 further comprising a directional coupler coupled to a transmission line leading from the power amplifier to receive signals proportional to levels of power supplied from the amplifier.

5. The apparatus of claim 4 wherein the directional coupler includes a forward power portion that receives signals proportional to the power supplied by the amplifier and a reverse power portion that receives signals proportional to power reflected back to the amplifier.

6. The apparatus of claim 5 comprising a measurement instrument connected to receive the respective signals from the forward and reverse power portions.

7. The apparatus of claim 6 wherein the measurement instrument computes a voltage standing wave ratio.

8. The apparatus of claim 7 wherein the measurement device computes a load reflection coefficient.

9. The apparatus of claim 6, wherein the computer is connected to and receives input signals from the measurement instrument, and the received signals are processed with the temperature data in generating the control signals.

10. A capacitive RF dielectric heating apparatus for treating food and seed products, the apparatus comprising:
a source of an AC RF signal at a frequency not greater than 300 MHz;
a first electrode that is connected to the source;
a second electrode that is connected to the source and that is spaced from the first electrode so that a product treatment zone is defined between the electrodes and an RF signal flows through the product treatment zone; and
impedance matching means for matching an impedance of the heated food or seed products to a predetermined constant by adjusting the frequency of the RF signal.

11. The apparatus of claim 10 wherein each of the first and second electrodes have multiple electrode elements which are electrically isolated from one another, individual elements of the first electrode being located opposite corresponding individual elements of the second electrode to provide multiple pairs of opposed electrode elements.

12. The apparatus of claim 10 wherein a computer-controlled switch is connected in the RF signal supply circuit for each pair of electrodes so that individual electrode pairs can be turned off and on by the computer.

13. The apparatus of claim 10 further comprising temperature sensors, and wherein at least some of the temperature sensors are supported on the first electrode.

14. A capacitive dielectric (RF) heating apparatus from treating food products, the apparatus comprising:
at least one pair of spaced-apart electrodes defining therebetween a food product treatment zone that can accommodate a food product to be treated;
signal generating circuitry connected to the electrodes, the signal generating circuitry being capable of providing an AC RF signal to charge the electrodes and generate an AC electric field in the food product treatment zone;
impedance measuring circuitry connected to the electrodes and to the signal generating circuitry, the impedance measuring circuitry measuring an impedance of the electrodes and the food product within the food product treatment zone; and
a controller linked to the impedance measuring circuitry and the signal generating circuitry, the controller controlling the signal generating circuitry and the AC electric field generated thereby based on the impedance measured by the impedance measuring circuitry.

15. The apparatus claim 14, wherein the signal generating circuitry includes a variable frequency RF signal generator.

16. The apparatus of claim 14, wherein the signal generating circuitry includes an amplifier connected to the variable frequency RF signal generator.

17. A capacitive RF dielectric heating apparatus for treating food and seed products, the apparatus comprising:
a source of an AC RF signal at an RF frequency not greater than 300 MHz, the source being connected to a pair of electrodes on opposite sides of a product treatment zone to cause an RF signal to flow through the product treatment zone;
a frequency controller to adjust the frequency of the RF signal between different RF frequencies;
a mathematical model that predicts Debye resonance frequency as a function of temperature for a product to be heated by the apparatus;
a temperature sensor to measure the temperature of a product located in the zone;
a computer programmed to receive temperature data from the temperature sensor, to process the temperature data using the model for the product, and to apply a control signal to the frequency controller to adjust the frequency of the RF signal to a Debye resonance frequency of the product at the sensed temperature in the zone.

18. The apparatus of claim 17 wherein:
the model provides Debye resonance frequency information for multiple types of products; and
the apparatus further comprises an input device to tell the computer what type of product is located in the zone.

19. The apparatus of claim 17 further comprising:
a model that provides Debye resonance frequency information for multiple types of packaging materials; and
an input device to tell the computer whether a product located in the zone is contained in packaging material and, if so, what type of packaging material,
the computer being programmed to signal the frequency controller to adjust the frequency of the RF signal to an RF frequency that is not a Debye resonance frequency of the packaging material.

20. The apparatus of claim 19 wherein the input device input device also tells the computer what type of product is located in the zone.

21. The apparatus of claim 19 wherein:
the model is a data table that contains Debye resonance frequencies for at least one product at various temperatures.

22. The apparatus of claim 19 wherein the model is a mathematical model that predicts the Debye resonance frequencies for various products based on the dielectric properties of the products.

23. The apparatus of claim 19 further comprising a field strength controller that responds to signals from the computer to adjust the power level of the RF signal in the zone.

24. A capacitive RF dielectric heating apparatus for treating food and seed products, the apparatus comprising:
a source of an AC RF signal at a frequency not greater than 300 MHz;
a first electrode that is connected to the source;
a second electrode that is connected to the source and that is spaced from the first electrode so that a product treatment zone is defined between the electrodes and an RF signal flows through the product treatment zone;
multiple temperature sensors positioned to measure the temperature at multiple regions of a product located in the zone; and
a computer which receives temperature data from the temperature sensors, processes the temperature data using a model for the product, and adjusts at least one characteristic of the RF signal in response to changes in the sensed temperatures in the zone.

25. The apparatus of claim 24 wherein each of the first and second electrodes have multiple electrode elements which are electrically isolated from one another, individual elements of the first electrode being located opposite corresponding individual elements of the second electrode to provide multiple pairs of opposed electrode elements.

26. The apparatus of claim 25 wherein a computer-controlled switch is connected in the RF signal supply circuit for each pair of electrodes so that individual electrode pairs can be turned off and on by the computer.

27. The apparatus of claim 24 wherein at least some of the temperature sensors are supported on the first electrode.

28. A system for heating a medium that includes a food product, comprising:

means for subjecting the medium to an AC electrical field generated by an RF waveform applied at a selected frequency that heats the medium;

means for measuring an effective load impedance initially dependent upon the impedance of the medium;

means for comparing the effective load impedance with an output impedance of a signal generating unit that generates the RF waveform; and means for automatically adjusting the effective load impedance to match the signal generating unit output impedance.

* * * * *

UNITED STATES PATENT AND TRADEMARK OFFICE
CERTIFICATE OF CORRECTION

PATENT NO.     : 6,784,405 B2
DATED          : August 31, 2004
INVENTOR(S)    : Benjamin A. Flugstad et al.

It is certified that error appears in the above-identified patent and that said Letters Patent is hereby corrected as shown below:

Column 9,
Line 44, delete "intensity (V/m)" and insert -- Intensity (V/m) --.
Line 50, delete "∈=∈'-j∈'" and insert -- "$\varepsilon=\varepsilon'-j\varepsilon$" --.
Lines 58, 59, 65 and 66, delete "∈" and insert -- $\varepsilon$ --.

Column 10,
Lines 9 and 10, delete "∈" and insert -- $\varepsilon$ --.

Column 18,
Line 58, delete "Khz-4 Ghz" and insert -- kHz-4 GHz --.
Line 59, delete "500 Mhz" and insert -- 500 MHz --.
Line 60, delete "Mhz" and insert -- MHz --.
Line 61, delete "Ghz" and insert -- GHz --.
Line 62, delete "100 khz-4.2 Ghz" and insert -- 100 kHz-4.2 GHz --.

Column 19,
Line 60, delete "electrodes;" and insert -- electrodes, --.

Column 21,
Lines 15 and 17, delete "HP16453A" and insert -- HP 16453A --.
Line 19, delete "—+" and insert -- -+ --.
Lines 54 and 55, delete "∈" and insert -- $\varepsilon$ --.

Column 22,
Lines 22, 29, 32 and 33, delete "∈" and insert -- $\varepsilon$ --.
Lines 39 and 42, delete "$T_0^2$" and insert -- $T_0^2$ --.
Lines 44, 46, 47 and 48, delete "∈" and insert -- $\varepsilon$ --.

Column 23,
Lines 15, 17 and 22, delete "∈" and insert -- $\varepsilon$ --.
Line 57, delete "$\tau_v$" and insert -- $\rho_v$ --.

Column 25,
Line 67, delete "S. Coxworthy" and insert -- S., Coxworthy --.

Column 26,
Lines 41 and 44, delete "$\int_0^f$" and insert -- $\int_0^t$ --.

UNITED STATES PATENT AND TRADEMARK OFFICE
CERTIFICATE OF CORRECTION

PATENT NO.  : 6,784,405 B2
DATED       : August 31, 2004
INVENTOR(S) : Benjamin A. Flugstad et al.

It is certified that error appears in the above-identified patent and that said Letters Patent is hereby corrected as shown below:

Column 28,
Line 40, delete "54" and insert -- 54. --.
Line 64, delee "neating" and insert -- heating --.

Column 30,
Line 33, delete "bum" and insert -- burn --.

Column 32,
Line 15, delete "send" and insert -- sent --.

Column 36,
Line 1, delete "A;" and insert -- A.; --.

Column 39,
Line 43, delete "from" and insert -- for --.

Column 40,
Line 40, delete "input device".

Signed and Sealed this

Thirty-first Day of May, 2005

JON W. DUDAS
*Director of the United States Patent and Trademark Office*